US012770042B2

(12) United States Patent
Sels et al.

(10) Patent No.: US 12,770,042 B2
(45) Date of Patent: Oct. 20, 2026

(54) QUANTUM GENERATIVE MODELS FOR SAMPLING MANY-BODY SPECTRAL FUNCTIONS

(71) Applicant: President and Fellows of Harvard College, Cambridge, MA (US)

(72) Inventors: Dries W. H. Sels, Allston, MA (US); Eugene A. Demler, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 1191 days.

(21) Appl. No.: 17/726,057

(22) Filed: Apr. 21, 2022

(65) Prior Publication Data

US 2023/0040289 A1 Feb. 9, 2023

Related U.S. Application Data

(63) Continuation of application No. PCT/US2020/056840, filed on Oct. 22, 2020.

(60) Provisional application No. 63/034,753, filed on Jun. 4, 2020, provisional application No. 62/924,498, filed on Oct. 22, 2019.

(51) Int. Cl.
*G06N 10/20* (2022.01)
*G06N 10/60* (2022.01)

(52) U.S. Cl.
CPC ............. *G06N 10/20* (2022.01); *G06N 10/60* (2022.01)

(58) Field of Classification Search
CPC ............................... G06N 10/20; G06N 10/60
See application file for complete search history.

(56) References Cited

U.S. PATENT DOCUMENTS

| | | | | |
|---|---|---|---|---|
| 6,218,832 | B1 * | 4/2001 | Chuang | B82Y 10/00 324/307 |
| 2019/0095811 | A1 * | 3/2019 | Antonio | G06N 10/60 |
| 2020/0293936 | A1 * | 9/2020 | Granade | G06N 10/20 |
| 2020/0364601 | A1 * | 11/2020 | Yamazaki | G06N 10/20 |

FOREIGN PATENT DOCUMENTS

WO WO-2021/154350 A2 8/2021

OTHER PUBLICATIONS

Wang, Jianwei, et al. "Experimental Quantum Hamiltonian Learning." arXiv preprint arXiv:1703.05402 (2017). (Year: 2017).*
Wang, Hefeng, et al. "Quantum Algorithm for Obtaining the Energy Spectrum of Molecular Systems." arXiv preprint arXiv:0907.0854 (2009). (Year: 2009).*
Wikipedia. Fast Fourier Transform. Article version from Aug. 16, 2019. Accessd via Wayback Machine. (Year: 2019).*
Daskin, Anmer, and Sabre Kais. "Decomposition of unitary matrices for finding quantum circuits: application to molecular Hamiltonians." The Journal of chemical physics 134.14 (2011). (Year: 2011).*
(Continued)

*Primary Examiner* — Markus A. Vasquez
(74) *Attorney, Agent, or Firm* — Foley Hoag LLP; Alexander Akhiezer; Erik A. Huestis

(57) ABSTRACT

Quantum generative models for sampling many-body spectral functions are provided. Quantum approximate Bayesian computation is provided for NMR model inference.

19 Claims, 19 Drawing Sheets

(56) References Cited

OTHER PUBLICATIONS

Seetharam, Kushal, et al. “Digital quantum simulation of NMR experiments.” arXiv preprint arXiv:2109.13298 (2021). (Year: 2021).*
Sels, Dries, et al. “Quantum approximate Bayesian computation for NMR model inference.” arXiv preprint arXiv:1910.14221 (2019). (Year: 2019).*
Jones, Jonathan A. “Quantum computing with NMR.” Progress in nuclear magnetic resonance spectroscopy 59.2 (2011): 91-120. (Year: 2011).*
Ossorio-Castillo, Joaquín, and Alexandre Rodríguez-Coello. “Simulating NMR Spectra with a Quantum Computer.” arXiv preprint arXiv:2410.20836 (2024). (Year: 2024).*
Wikipedia. Nuclear magnetic resonance quantum computer. Article version from Dec. 27, 2018. https://en.wikipedia.org/w/index.php?title=Nuclear_magnetic_resonance_quantum_computer&oldid=875538015. (Year: 2018).*
Benedetti et al., “Parameterized quantum circuits as machine learning models,” arXiv: 1906/07682 (18 pages) (2019).
Biamonte et al., “Quantum machine learning,” Nature, 549(7671): 195-202 (2017).
International Search Report for International Application No. PCT/US2020/056840 mailed Aug. 17, 2021.
Sels et al., “Quantum approximate Bayesian computation for NMR model inference,” arXiv: 1910.14221 (14 pages) (2019).
Wang et al., “Experimental Quantum Hamiltonian Learning,” arXiv: 1703.05402 (6 pages) (2017).
Wilson et al., “Bayesian Inference for NMR Spectroscopy with Applications to Chemical Quantification,” arXiv: 1402.3580 (26 pages) (2014).

* cited by examiner

QUANTUM GENERATIVE MODELS FOR SAMPLING MANY-BODY SPECTRAL FUNCTIONS

CROSS-REFERENCE TO RELATED APPLICATIONS

This application is a continuation of International Application No. PCT/US2020/056840, filed Oct. 22, 2020, which claims the benefit of U.S. Provisional Application No. 62/924,498, filed Oct. 22, 2019, and of U.S. Provisional Application No. 63/034,753, filed Jun. 4, 2020, each of which is hereby incorporated by reference in its entirety.

STATEMENT REGARDING FEDERALLY SPONSORED RESEARCH OR DEVELOPMENT

This invention was made with Government support under grant number D18AC00014 awarded by the Defense Advanced Research Projects Agency (DARPA) and grant number FA95501610323 awarded by the Air Force Office of Scientific Research (AFOSR). The Government has certain rights to this invention.

BACKGROUND

Embodiments of the present disclosure relate to quantum computing, and more specifically, to quantum generative models for sampling many-body spectral functions.

BRIEF SUMMARY

According to embodiments of the present disclosure, methods of and computer program products for determining properties of a molecule are provided. In various embodiments, a state is prepared on a quantum computer, the state corresponding to a physical property. The state is evolved on the quantum computer, said evolution corresponding to a Hamiltonian having a plurality of parameters, the plurality of parameters corresponding to a hypothetical molecule. The state is sampled after said evolution, thereby determining hypothetical observations of the hypothetical molecule.

In various embodiments, the hypothetical observations are compared to actual observations. Based on said comparing, the plurality of parameters is varied to minimize a difference between the hypothetical observations and the actual observations. In some embodiments, said varying the plurality of parameters comprises variational Bayesian inference. In some embodiments, said varying the plurality of parameters comprises gradient descent.

In various embodiments, the hypothetical observations comprise spectra.

In various embodiments, the quantum computer comprises a plurality of system qubits, and said sampling further comprises: measuring the plurality of system qubits. In some embodiments, said sampling further comprises: applying a fast Fourier transform to determine a spectrum corresponding to the hypothetical molecule.

In various embodiments, the quantum computer comprises a plurality of system qubits and a plurality of control qubits, each of the plurality of control qubits corresponding to one of the plurality of system qubits, the method further comprising: initializing the plurality of control qubits according to an equal superposition of all controls. In some embodiments, said sampling further comprises: measuring the plurality of control qubits. In some embodiments, said sampling further comprises: applying a quantum fast Fourier transform to determine a spectrum corresponding to the hypothetical molecule. In some embodiments, said preparing further comprises: preparing the plurality of system qubits with an initial state; coupling each of the plurality of system qubits with one of the plurality of control qubits; coupling an ancilla qubit to an operator, the operator corresponding to the physical property; coupling each system qubit and its corresponding control qubit to the ancilla qubit; measuring the ancilla qubit. In some embodiments, coupling each system qubit and its corresponding control qubit to the ancilla qubit comprises applying a Hadamard gate to each system qubit.

In various embodiments, the sampling comprises uniform sampling or importance sampling.

Performing another Hadamard gate on the ancilla and post-selecting the outcome on $|\mathbf{1}\rangle$, the entangled pair state will be transformed into the desired $|O\rangle$ state. The success probability is of the procedure is determined by the ratio of the typical value of $O^2$ to its maximal value $$O^2_{max}.$$

Figure 5:
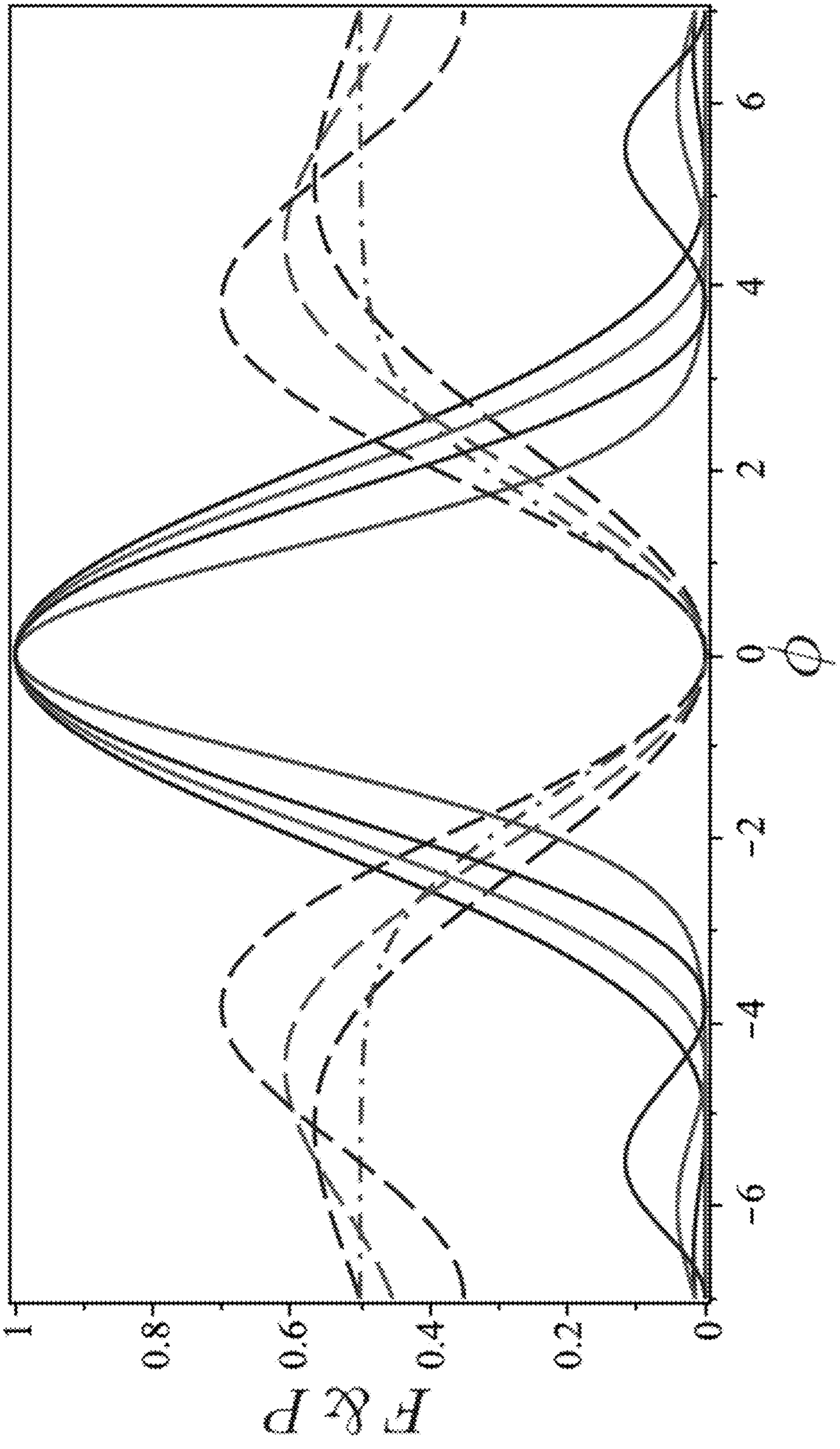

FIG. 5 is a graph of fidelity vs. rotation angle, illustrating preparation efficiency. Fidelity between the post-selected state $|\psi_1\rangle$ and the target state $|O\rangle$ decays with the rotation angle $\phi$ of the controlled unitary rotation $U(\phi)$ (full lines). Similarly, the success probability increases from 0 to ½ when the angle increases (dashed lines). Different curves show Equation 20 and Equation 19 for different eigenvalue distributions of O. Results are shown for Wigner semicircle, uniform, arcsine and Gaussian eigenvalue distributions. Each of these distributions has a success probability P=c(1−F) in a broad region of $\phi$'s around zero. The constant c=O(1) for all distributions, ½, 5/9, ⅔, ⅓ for the semicircle, uniform, arcsine and Gaussian respectively.

Figure 6A:
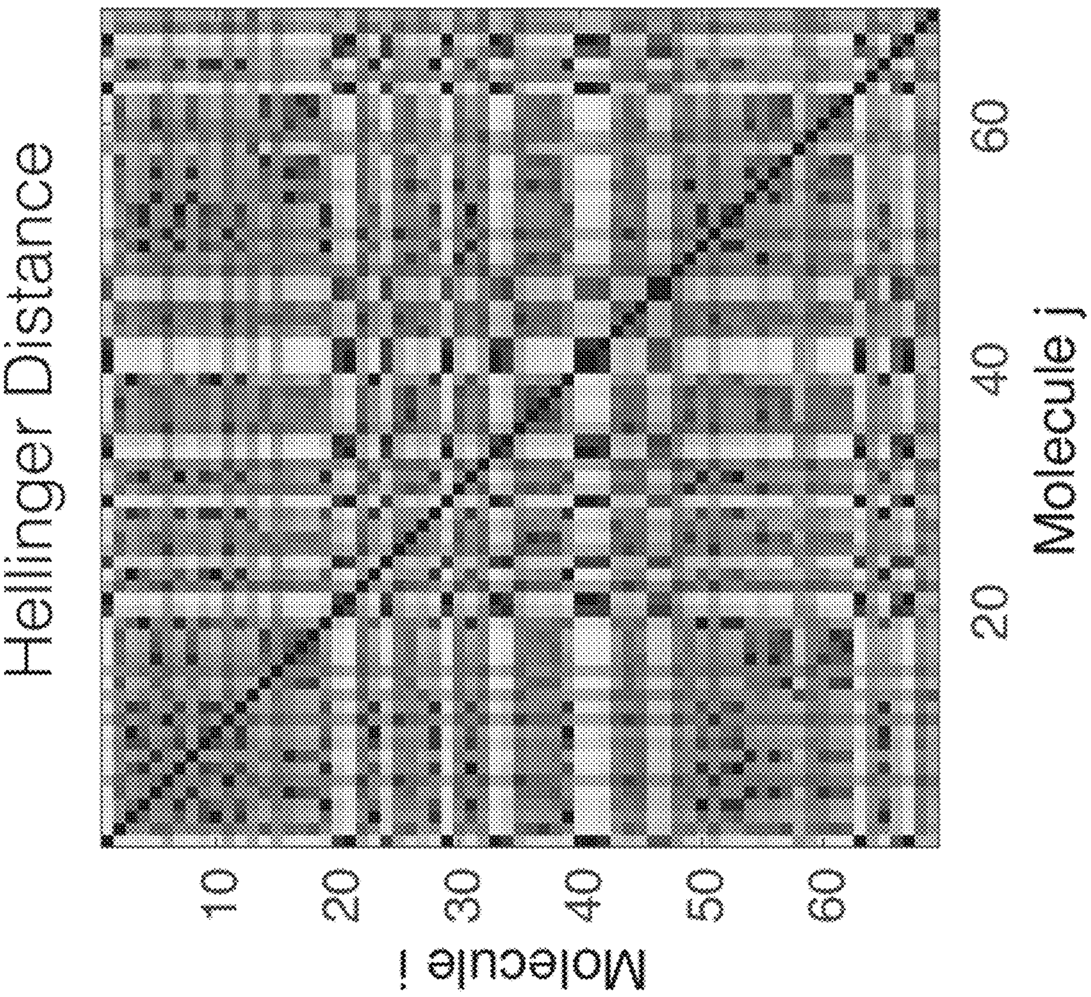
Figure 6B:
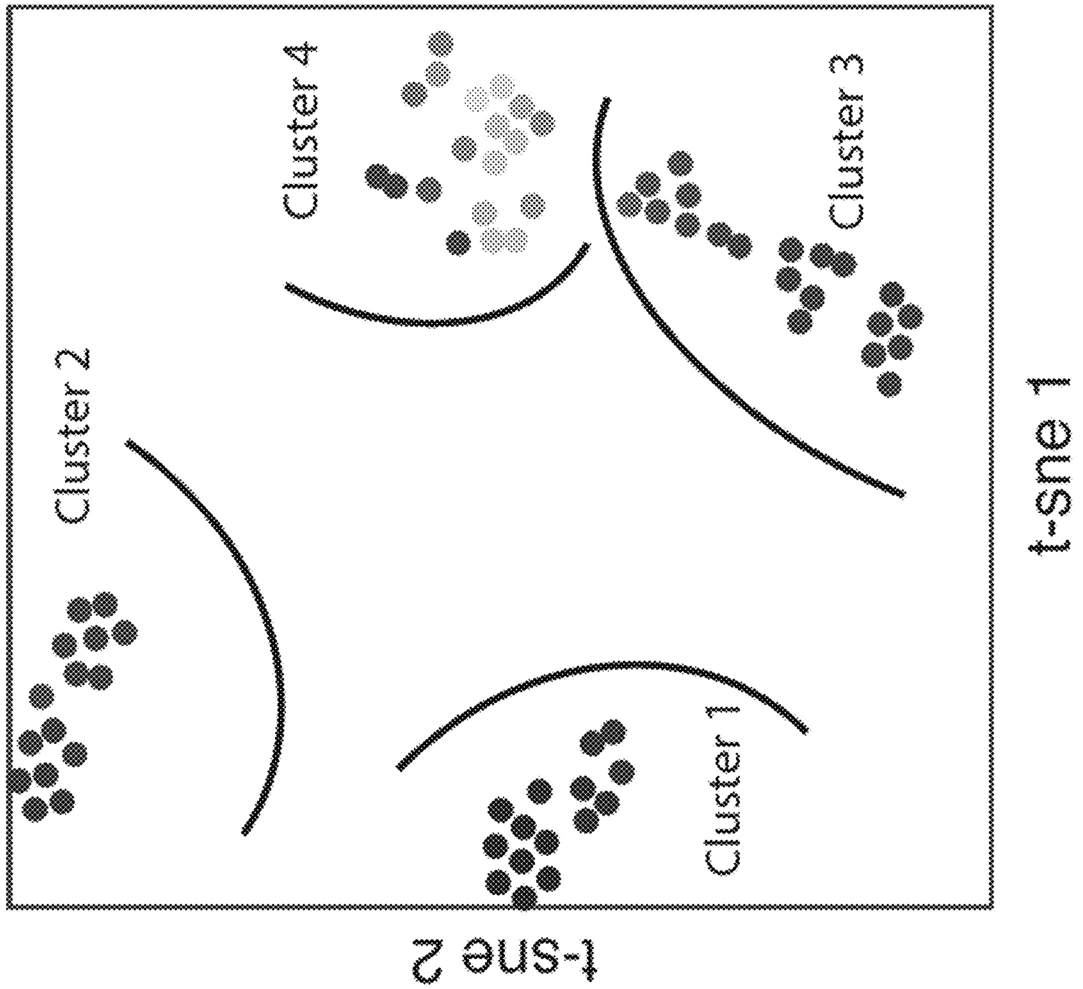

FIGS. 6A-B illustrate clustering. In order to identify whether naturally occurring molecules have some atypical NMR spectrum, we perform a clustering analysis. In FIG. 6A, we show the distance between the various NMR spectra, where the Bhattacharyya coefficient is used to measure similarity. To obtain a meaningful comparison, spectra are shifted and scaled such that they are all centered around the same frequency and have the same bandwidth. To extract clusters we perform a t-SNE shown in FIG. 6B with perplexity of 10; which is chosen because it has minimal Kullback-Leibler (KL) loss. The KL-loss was 0.145.

Figure 7A:
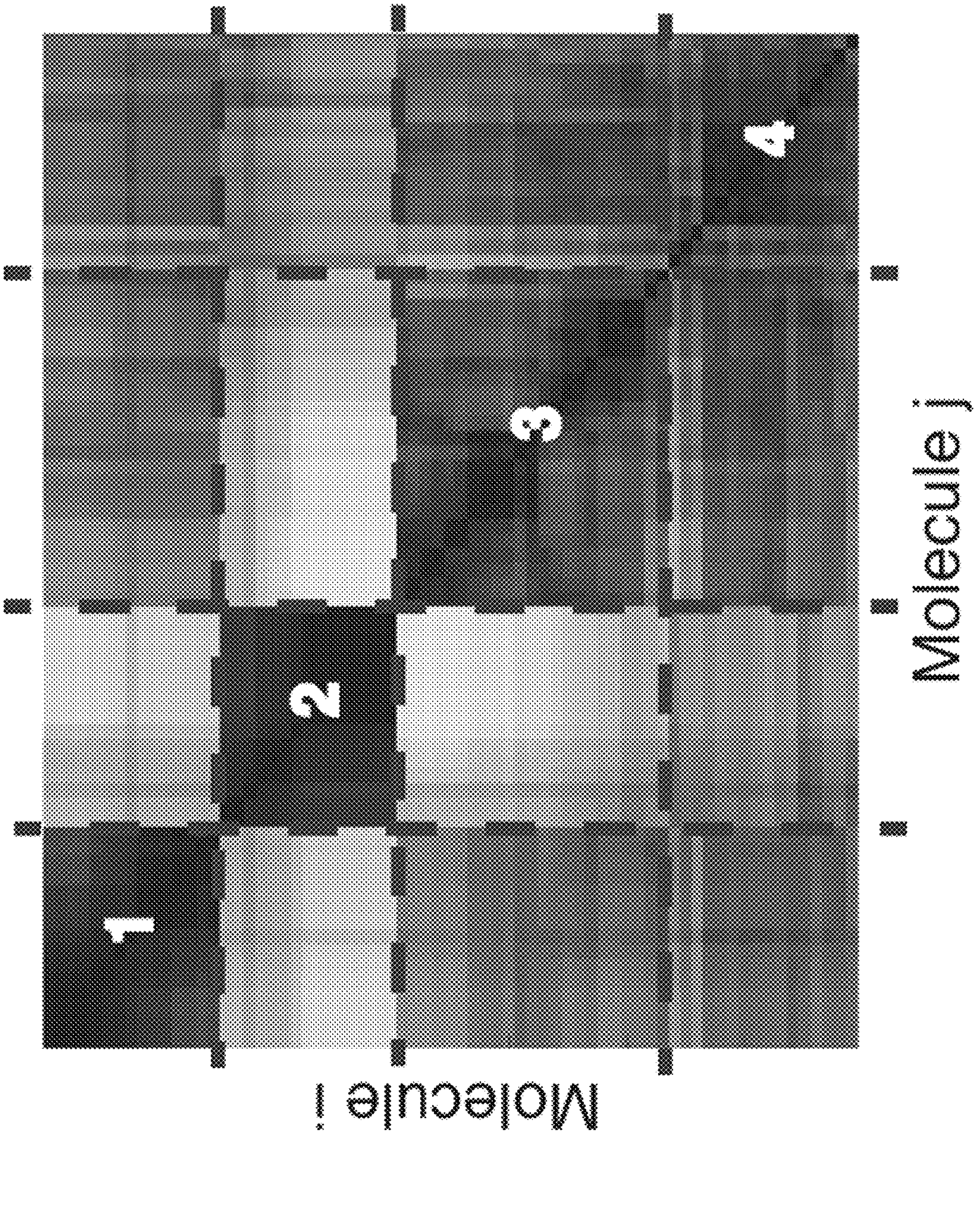
Figure 7B:
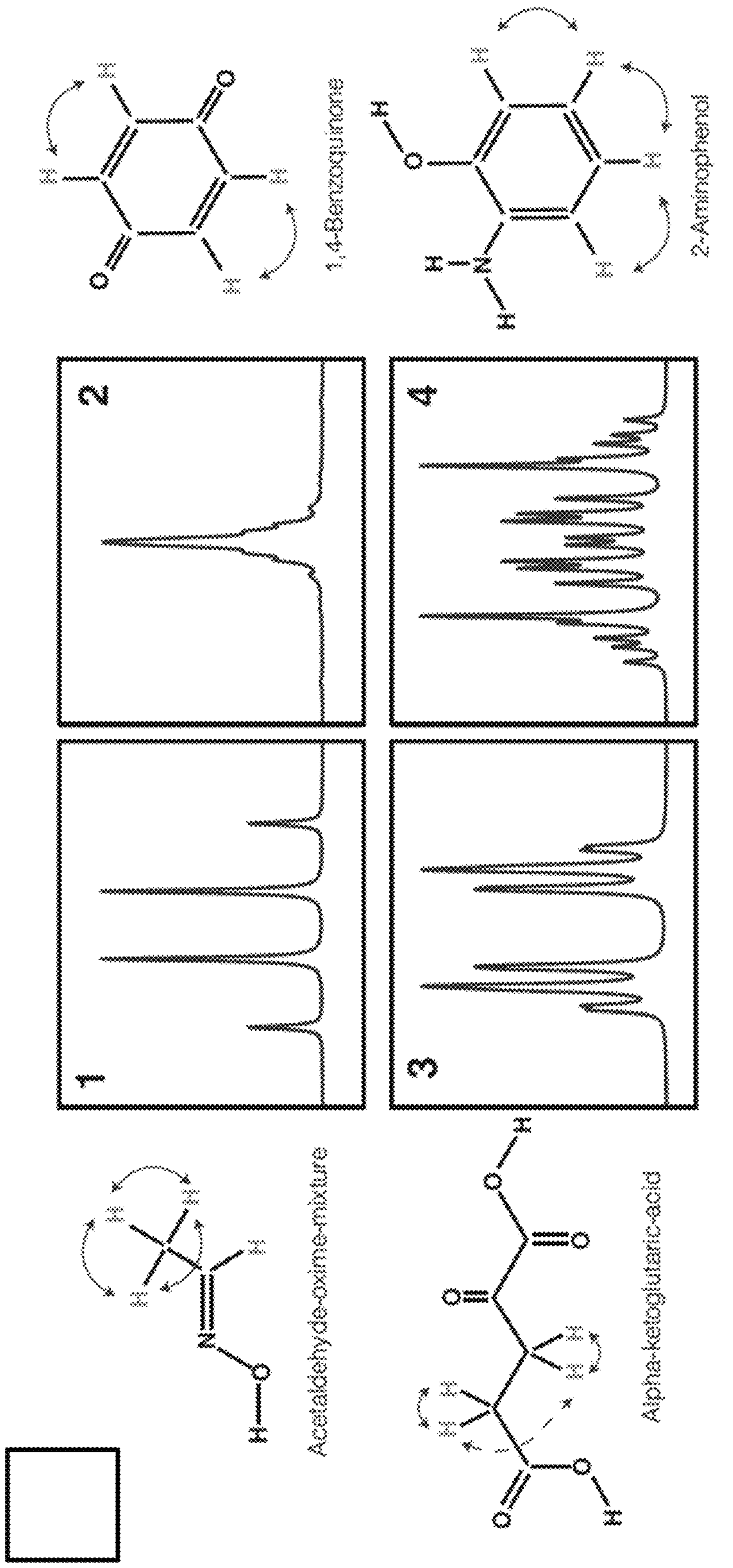

FIGS. 7A-B illustrate NMR Spectra. By clustering the molecules according to the Hellinger distance t-SNE clusters we can reorganize the distance matrix as shown in FIG. 7A. For each of the clusters, we look at the different spectra, which indeed show great similarity. A representative spectrum for each of the clusters is shown in FIG. 7B, where the spectra are labeled according to the t-SNE clusters shown in FIG. 6B. In addition, we show an example small molecule out of this cluster next to the associated spectrum. The atoms and interactions responsible for the shown portions of the spectra are indicated in blue and red arrows respectively.

Figure 8:
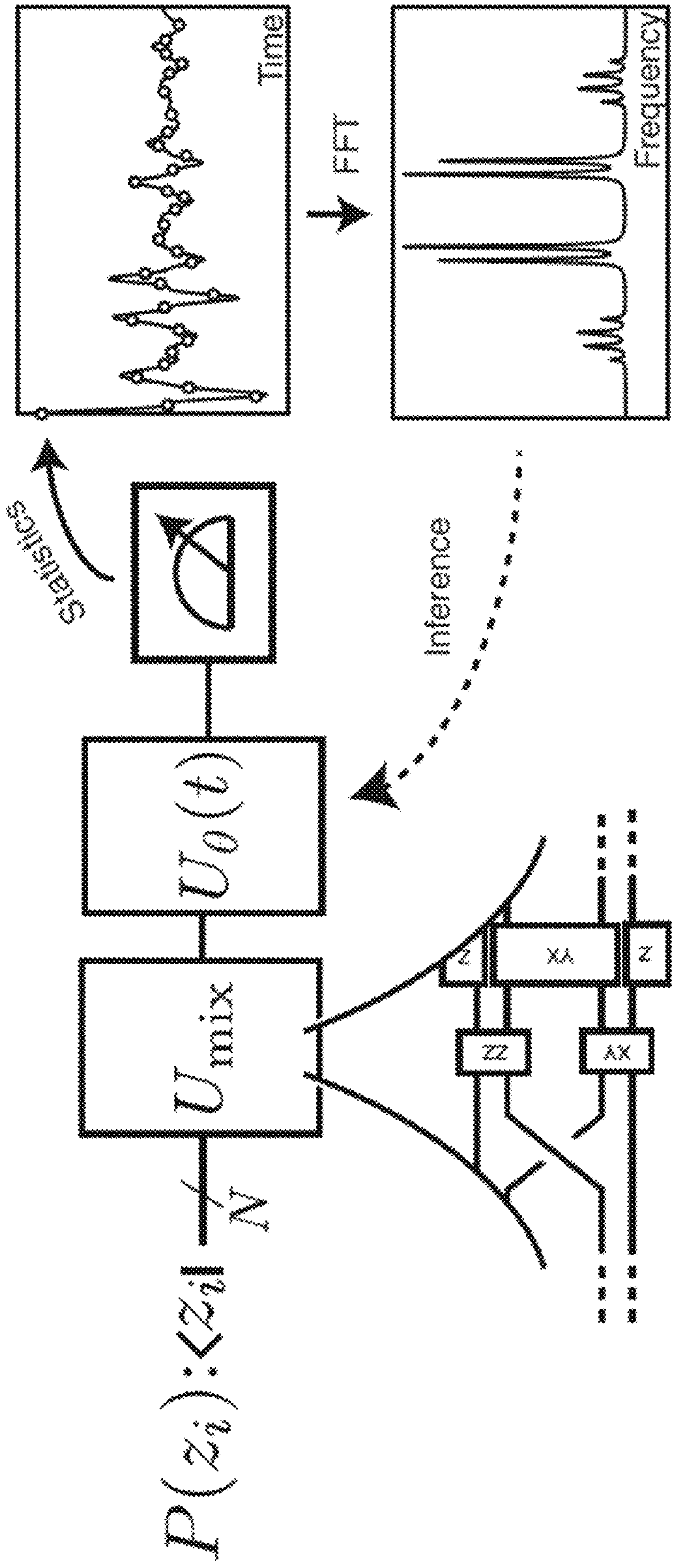

FIG. 8 is a schematic view of an exemplary method. Take a product state $|z_i\rangle$ with a given total magnetization $m_i$, according to the relative fraction of Hilbert space occupied by $m_i$ states $P(z_i)$. This product state is scrambled with a unitary channel that conserved total Z magnetization. After this initial preparation, we evolve the state under the Hamiltonian $H(\theta)$ and measure the Z magnetization at time t. By applying a fast Fourier transform we obtain the spectrum which can be used to infer the parameters of the Hamiltonian.

Figure 9:
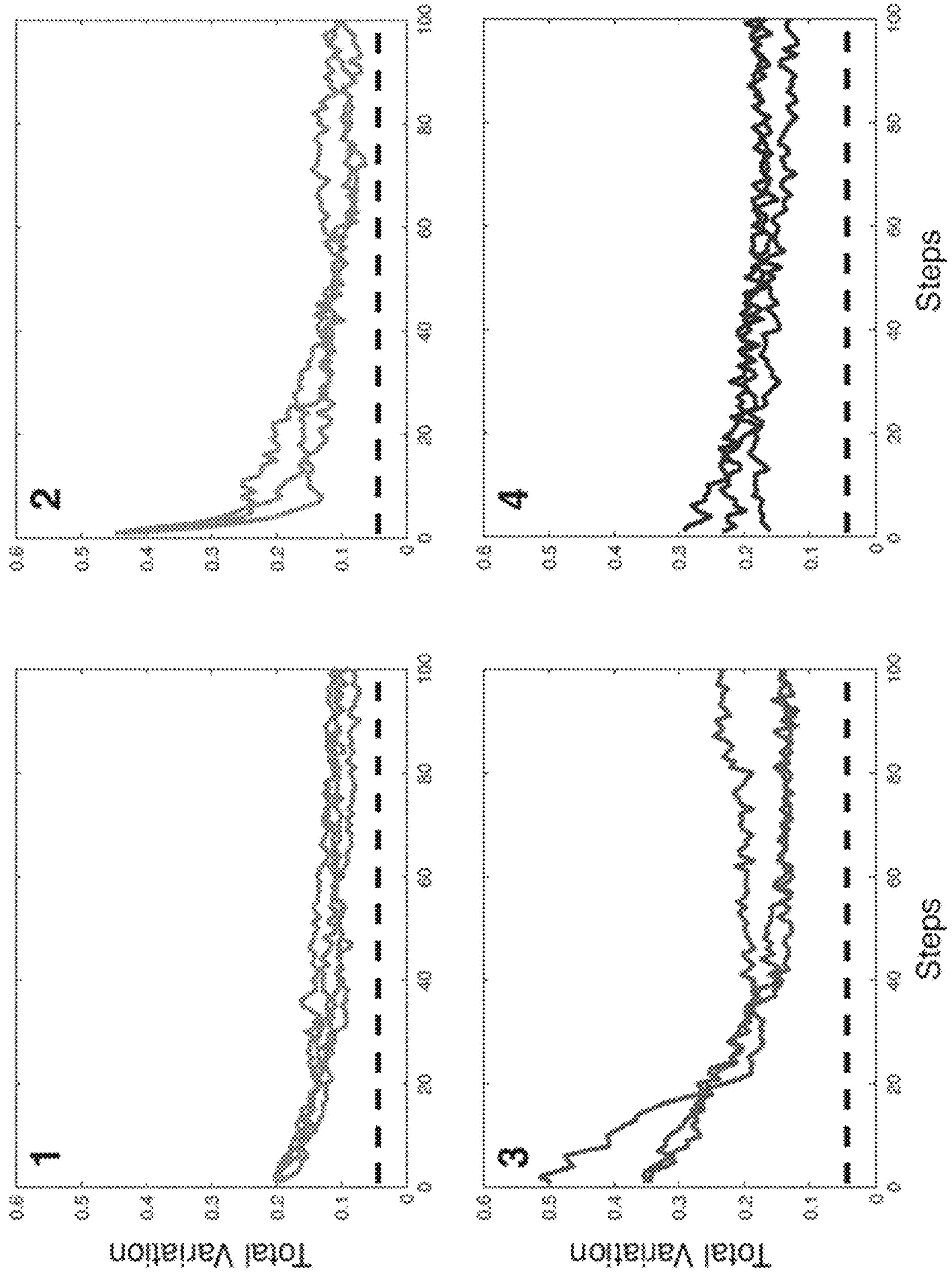

FIG. 9 shows graphs of total variation vs. steps, illustrating inference. For each of the clusters, labeled according to FIG. 7, we investigate the convergence of the parameter inference in our variational Bayesian inference scheme by looking at the total variation distance between the spectra. The dashed line indicates the shot noise limit, set by the finite number of acquired quantum measurements.

Figure 10A:
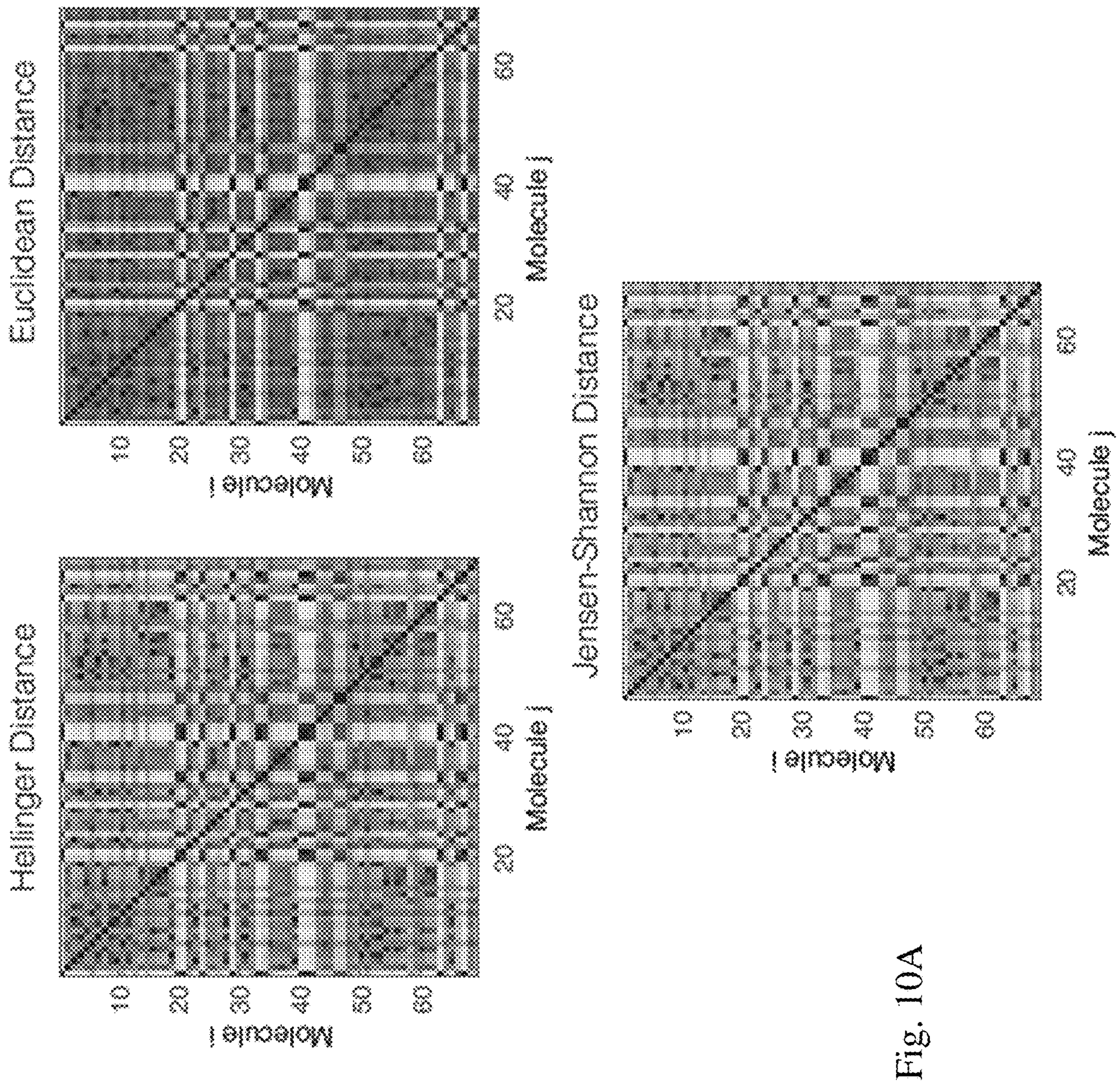
Figure 10B:
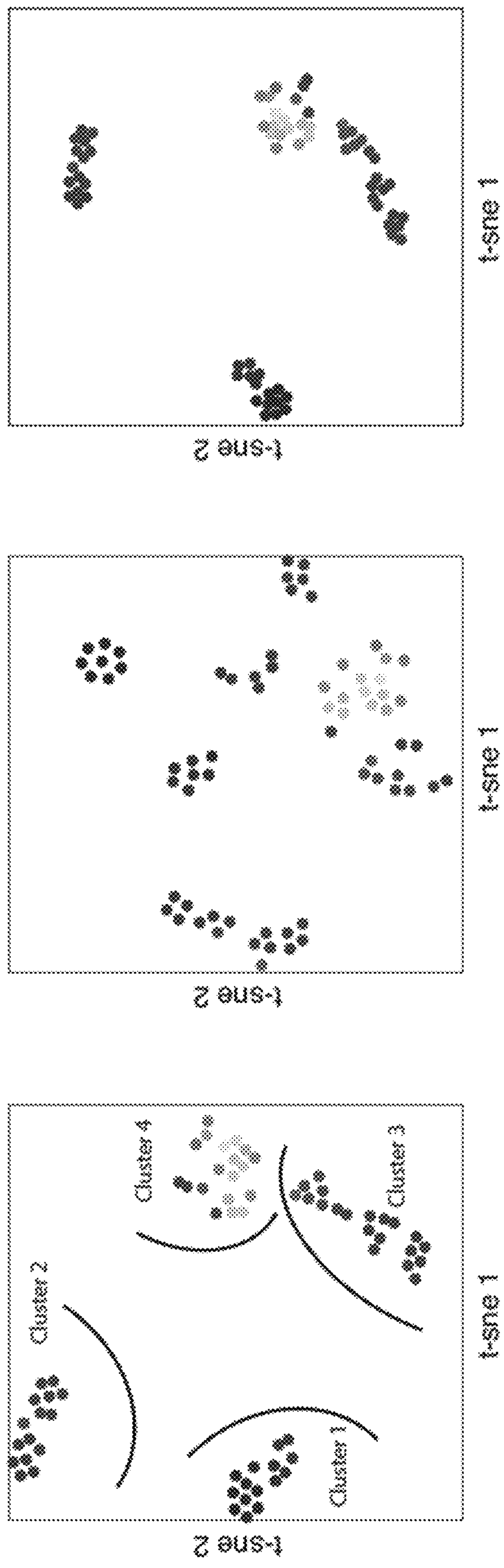

FIGS. 10A-B illustrate clustering. In order to identify whether naturally occurring molecules have some atypical NMR spectrum we perform a clustering analysis based on 3 different measures of similarity. In FIG. 10A we show the distance between the various NMR spectra for three different distant metrices. To extract clusters we perform a t-SNE shown in FIG. 10B for each of the metrices respectively. The t-SNE is performed with the same initial seed and perplexity (10) for all plots. The KL-loss for the shown plots was {0.145,0.510,0.299} for the Hellinger, Euclidean and JS distance respectively.

Figure 11:
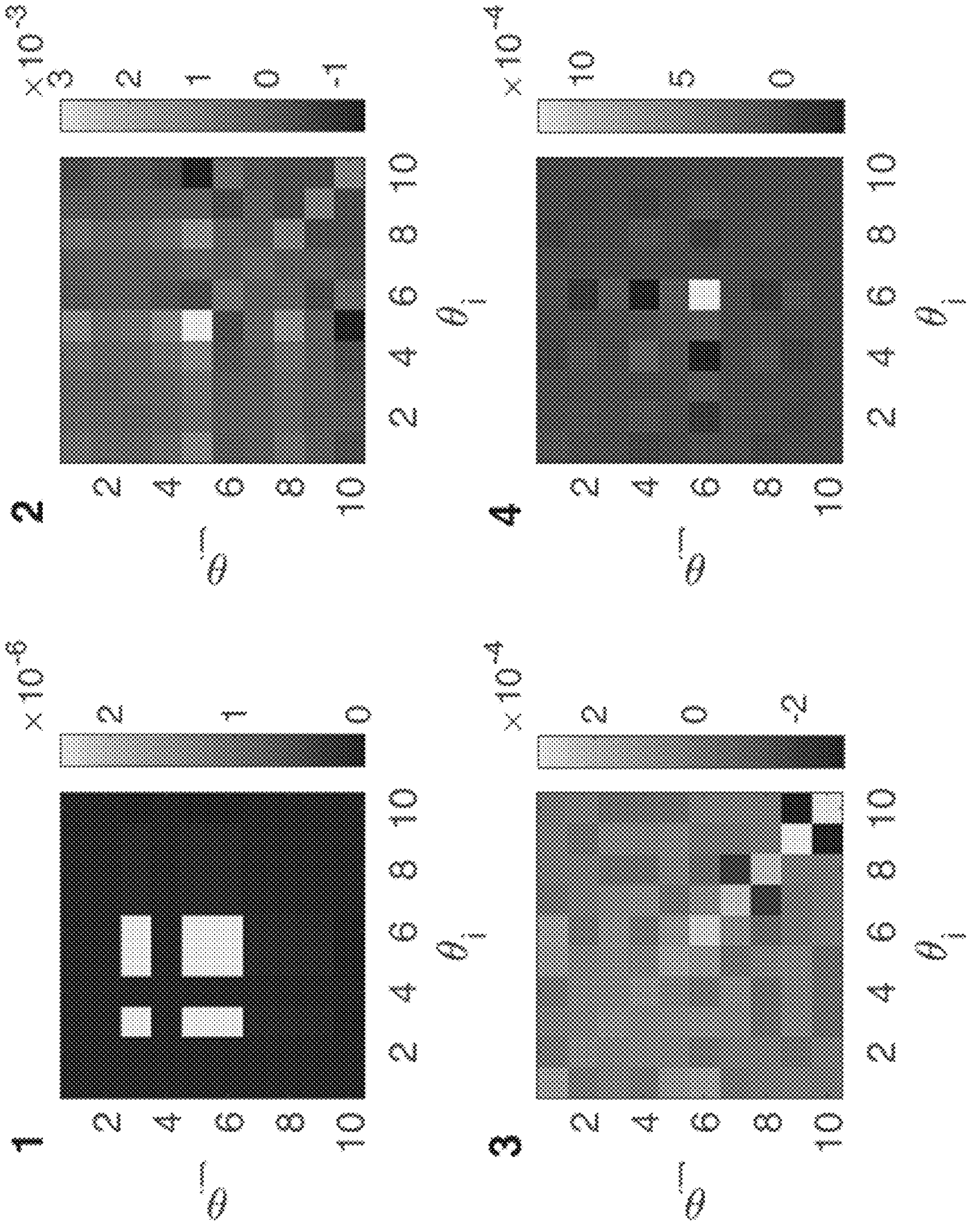

FIG. 11 shows FIM features. Fisher information metric for a typical molecule out of each cluster.

Figure 12:
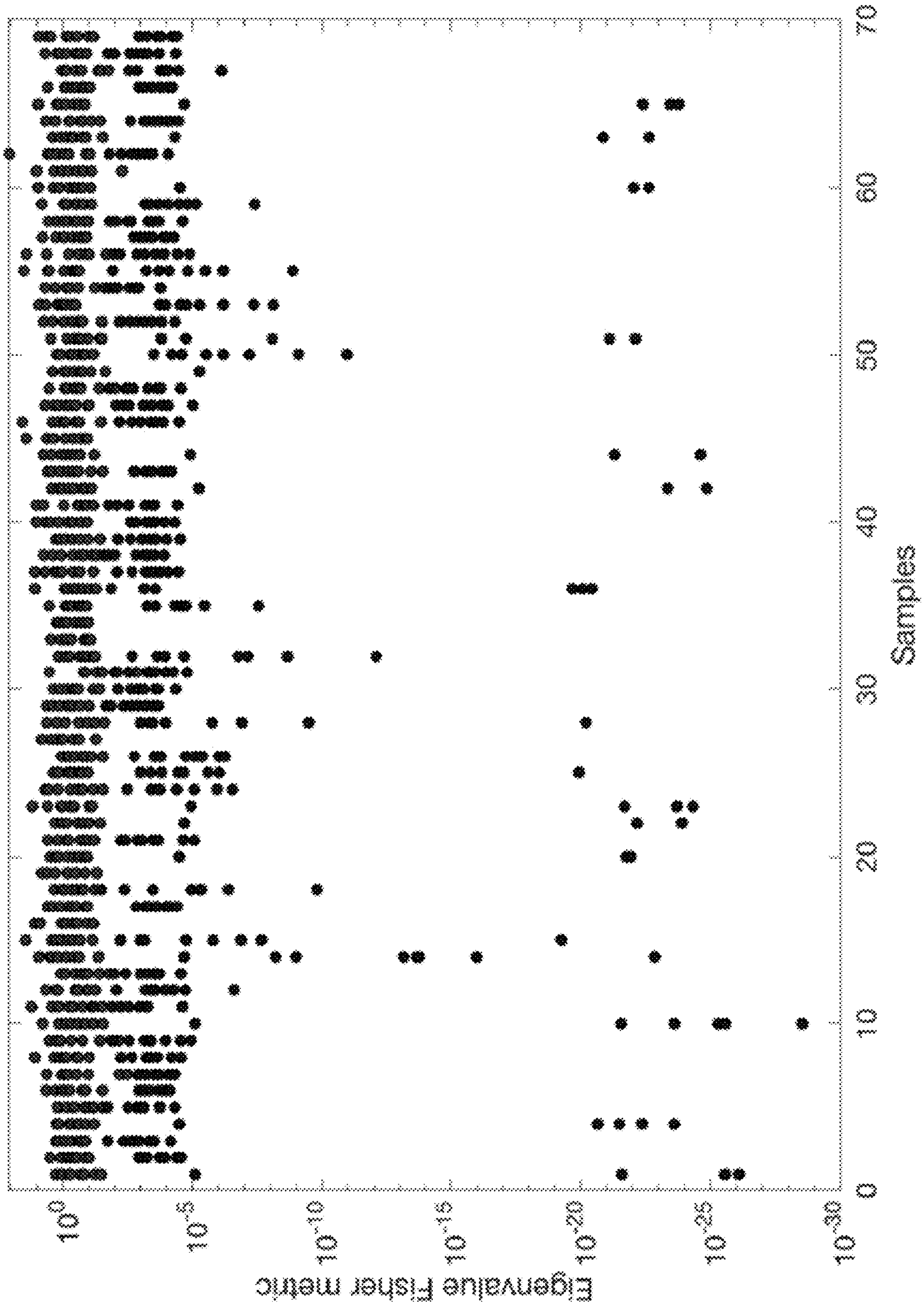

FIG. 12 shows FIM eigenvalues. Blue dots show the eigenvalues of the FIM for all the molecules contained in the dataset. Red dots show eigenvalues for samples obtained by sampling each of the parameters $\theta_i$ from a normal distribution with unit variance and zero mean.

Figure 13A:
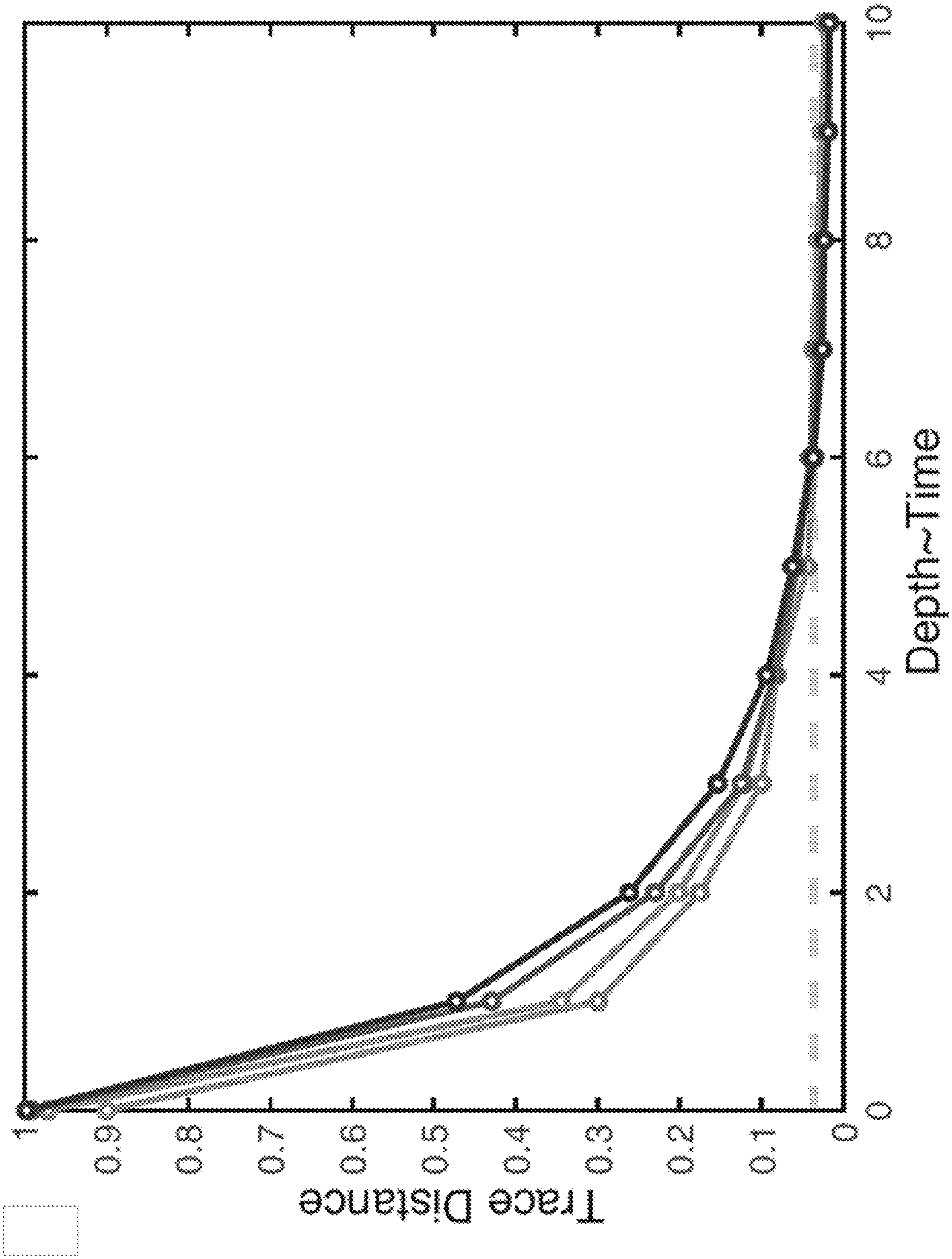
Figure 13B:
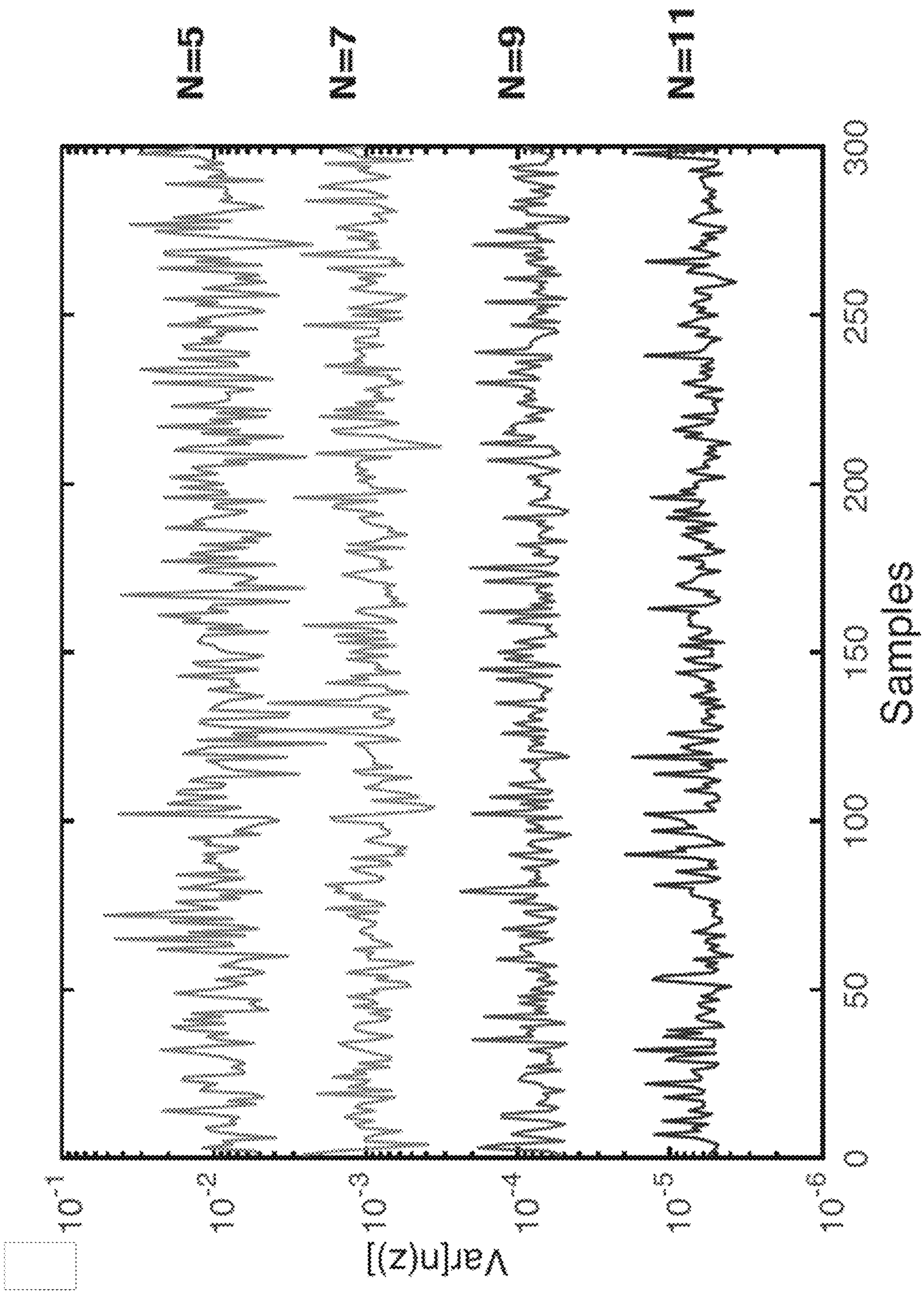

FIGS. 13A-B illustrate unitary scrambling. For systems of size N={5,7,9,11} we investigate scrambling in the $M_z=\frac{1}{2}$ subsector under random circuits build out of Ising XY and ZZ gates and Phase shift gates. We start from a product state and at each step we make random pairs to apply the Ising gates in parallel after which we do a random local phase-shift gate, applying $S_i^z$ over a random angle. FIG. 13A shows the trace distance of the ensemble averaged state (estimated by taking 10,000 random circuit samples) and the infinite temperature uniform distribution. The gray dashed line indicates the noise limit at which we cannot accurate compute the distance because we only have a limited amount of samples. FIG. 13B shows the variance of the n(z) density at a circuit depth of 10 for various system sizes and circuit realizations.

Figure 14:
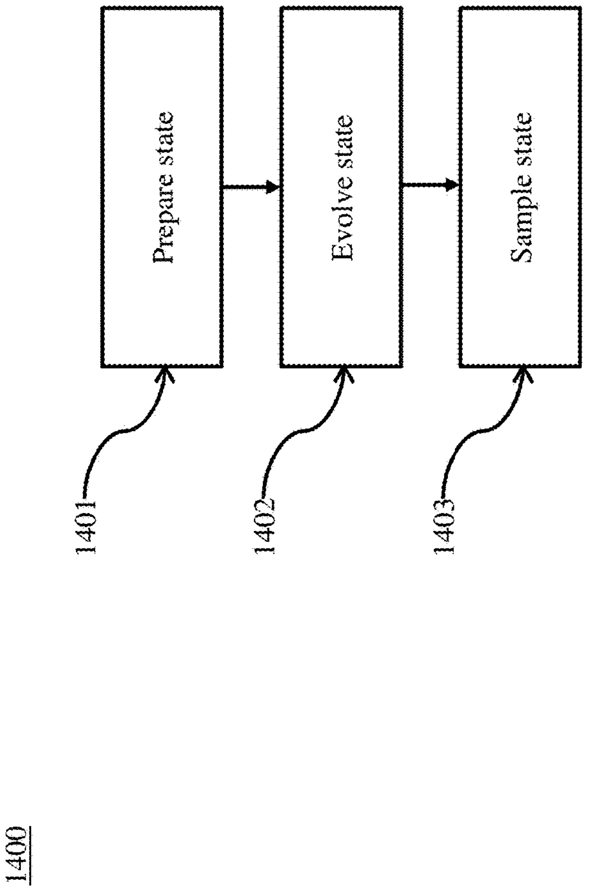

FIG. 14 illustrates a method of determining properties of a molecule according to embodiments of the present disclosure.

Figure 15:
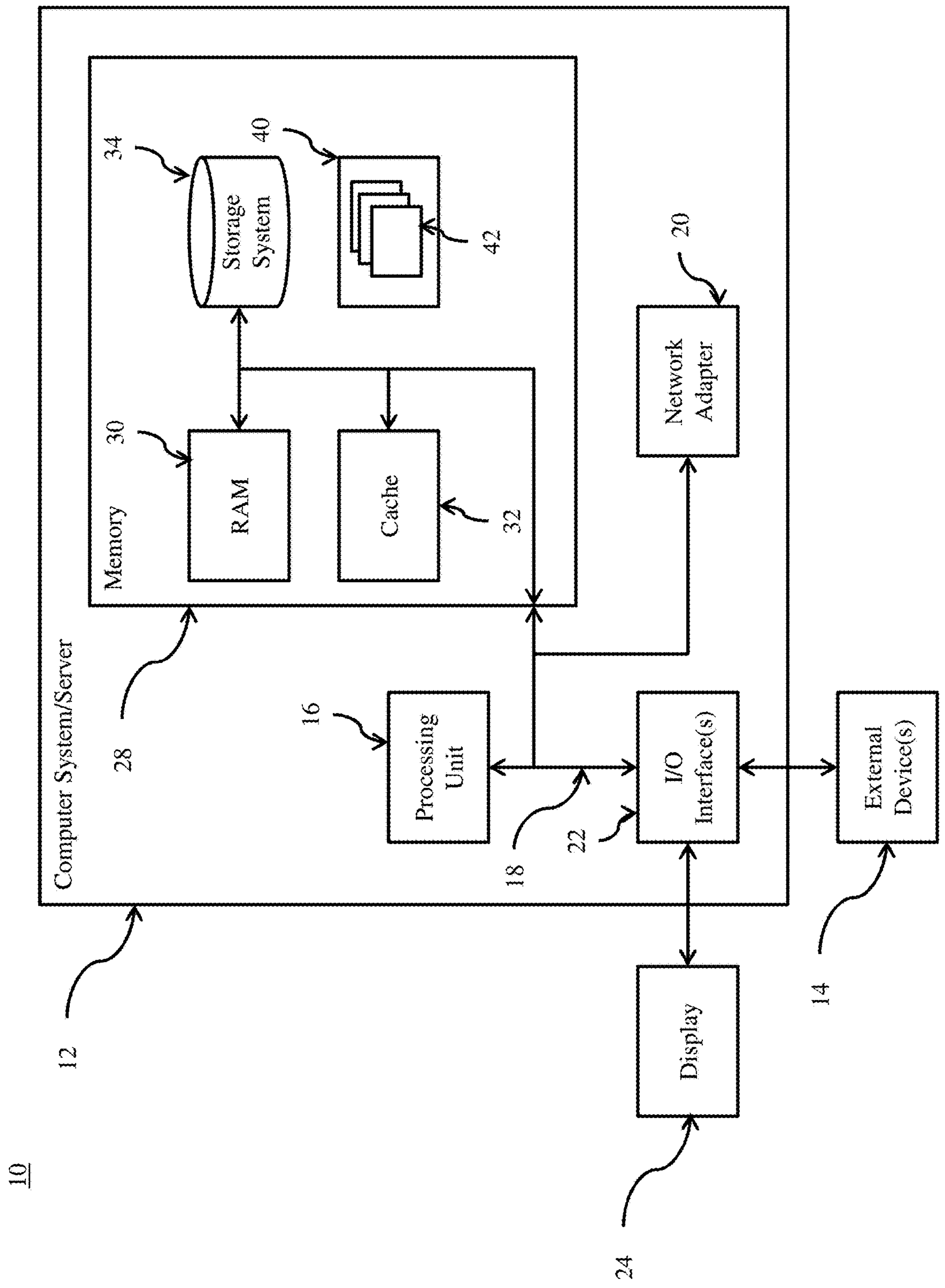

FIG. 15 depicts a classical computing node according to an embodiment of the present disclosure.

DETAILED DESCRIPTION

Quantum phase estimation is at the heart of most quantum algorithms with exponential speedup, in this letter we demonstrate how to utilize it to compute the spectrum of retarded two-point correlation functions in many-body quantum systems. The present disclosure provides a circuit that acts as an efficient quantum generative model, providing samples out of the spectral function of high rank observables in polynomial time. This includes many experimentally relevant spectra such as the dynamic structure factor, the optical conductivity or the NMR spectrum. Experimental realization of the algorithm, apart from logarithmic overhead, requires doubling the number of qubits as compared to a simple analog simulator.

Quantum computers possess the ability to solve problems that are intractable to classical ones. They can have super-polynomial speedup over the best known classical algorithm; so-called quantum supremacy. In addition to function problems such as implementing Shor's algorithm, sampling problems are also suitable for implementation on near-term quantum computers, as it appears that one does not need a full universal quantum computer to get quantum speedup. For example, sampling from the output distributions of random quantum circuit, classically requires a direct numerical simulation of the circuit, with exponential computational cost in the number of qubits. While these random circuits have the virtue of being theoretically under control—meaning there is more confidence about the fact that they are hard to sample from than there is about factoring being hard—they are of limited practical use. They don't solve any problem other than providing evidence for quantum supremacy. Here, we trade some of the hardness for practical usefulness and provide a quantum circuit to obtain samples out of the spectral function of operators evolving under Hamiltonian dynamics in a many-body system. The problem essentially belongs to the class DQC1, which is believed to be strictly smaller than BQP, while still containing classically intractable problems.

Spectroscopy is an important tool for characterizing condensed matter and molecular systems. There is an entire plethora of techniques, each sensitive to different observables and in different parts of the energy spectrum. Many of those measurements can be formulated as a Fourier transform of some time dependent correlation function. Take for example, optical conductivity which probes the current-current correlations $\sigma(\omega)=\langle j(\omega)j(-\omega)\rangle/i\omega$ or inelastic neutron scattering which measure the density-density correlations $S_k(\omega)=\langle\rho_k(\omega)\rho{-}k(-\omega)\rangle$, etc. Understanding the behavior of these correlation functions is one of the central goals in theoretical research quantum many-body systems. For example, they allow to probe collective excitations of the system and to characterize universal dynamics close to quantum phase transitions. Furthermore, they can be a powerful tool for studying non-equilibrium dynamics. On a computational level, computing dynamical response functions is inherently difficult, as the induced coherence makes the system strongly correlated. The exponential dimension of the underlying Hilbert space precludes exact methods and for large systems one typically has to rely on approximate methods such as density-matrix renormalization group (DMRG), dynamical mean-field theory (DMFT), semi-classical phase space methods or even time-dependent density functional theory (DFT). Each of these methods provides an accurate description for a particular class of problems but they all have limitations, e.g., long-range correlations are poorly captured by DMFT and DMRG becomes intractable at late times or in higher dimensions. While much progress has been made in extending the regime of validity of all these methods, a universal solution to the quantum simulation problem should not exist.

Here we present a method to efficiently extract samples out of spectral functions using a quantum computer. The method requires a number of qubits that is proportional the volume of the system. Under certain constraints—which are met in most of the physically relevant situations—the algorithm runs in polynomial time. We focus on the infinite temperature correlation function but extensions to finite and zero temperature are straightforward and briefly discussed below. Note that, even at infinite temperature, strong correlations can lead to many interesting phenomena such as anomalous diffusion, impurity induced correlations, many-body localization and excited state quantum phase transitions. Moreover, some spectroscopic techniques, such as electron spin resonance (ESR) and nuclear magnetic spin resonance (NMR), are naturally described by infinite temperature ensembles.

The below discussion is structured in the following way. First, we discuss how to extract the spectrum by performing quantum phase estimation on a special purified state whose precise form depends on the operator of interest. It is this part of the algorithm which is responsible for the speedup. The fact that the entire operator content is represented in a single pure state eliminates the need to sample over all initial states, making it more efficient than performing analog Ramsey interferometry. Second, we return to the question of preparing the required initial state and show that it does not degrade the speedup. We provide an explicit algorithm to construct the required states by postselection on an ancilla qubit. Finally, we discuss extension to zero and finite temperature states.

Whereas (digital) classical computers run on classical bits, which represent a binary state of value 0 or 1, the fundamental unit of quantum computers is called a qubit. The state of a qubit can be 0, 1, but also a superposition of 0 and 1. Quantum computers leverage this mixed state to perform more complex computations, as each qubit can represent more information than a binary classical bit. Quantum computing and quantum information science involves manipulating qubits' states to achieve a computational task and analyzing their output states.

As used herein, a quantum gate (or quantum logic gate) is a basic quantum circuit operating on a small number of qubits. By analogy to classical computing, quantum gates form quantum circuits, like classical logic gates form conventional digital circuits. Quantum logic gates are represented by unitary matrices. Various common quantum gates operate on spaces of one or two qubits, like classical logic gates operate on one or two bits. As matrices, quantum gates can be described by $2^2 \times 2^n$ sized unitary matrices, where n is the number of qubits. The variables that the gates act upon, the quantum states, are vectors in $2^n$ complex dimensions. The base vectors indicate the possible outcomes if measured, and a quantum state is a linear combinations of these outcomes. The action of the gate on a specific quantum state is found by multiplying the vector which represents the state by the matrix representing the gate. Accordingly, a given quantum state may be prepared on a quantum circuit through application of a plurality of gates. A given state may be characterized as a distribution function that provides a distribution describing a continuous random variable.

Various physical embodiments of a quantum computer are suitable for use according to the present disclosure. In general, the fundamental data storage unit in quantum computing is the quantum bit, or qubit. The qubit is a quantum-computing analog of a classical digital-computer-system bit. A classical bit is considered to occupy, at any given point in time, one of two possible states corresponding to the binary digits 0 or 1. By contrast, a qubit is implemented in hardware by a physical component with quantum-mechanical characteristics. Each unit has an infinite number of different potential quantum-mechanical states. When the state of a qubit is physically measured, the measurement produces one of two different basis states. Thus, a single qubit can represent a one, a zero, or any quantum superposition of those two qubit states; a pair of qubits can be in any quantum superposition of 4 states; and three qubits in any superposition of 8 states. While qubits are characterized herein as mathematical objects, each corresponds to a physical qubit that can be implemented using a number of different physical implementations, such as trapped ions, optical cavities, individual elementary particles, molecules, or aggregations of molecules that exhibit qubit behavior.

In some embodiments, a quantum circuit comprises nonlinear optical media. In some embodiments, a quantum circuit comprises a cavity quantum electrodynamics device. In some embodiments, a quantum circuit comprises an ion trap. In some embodiments, a quantum circuit comprises a nuclear magnetic resonance device. In some embodiments, a quantum circuit comprises a superconducting device. In some embodiments, a quantum circuit comprises a solid state device.

In contrast to classical gates, there are an infinite number of possible single-qubit quantum gates that change the state vector of a qubit. Changing the state of a qubit state vector is therefore referred to as a rotation. A rotation, state change, or single-qubit quantum-gate operation may be represented mathematically by a unitary 2×2 matrix with complex elements.

A quantum circuit can be specified as a sequence of quantum gates. To conceptualize a quantum circuit, the matrices corresponding to the component quantum gates may be multiplied together in the order specified by the symbol sequence to produce a 2×2 complex matrix representing the same overall state change. A quantum circuit may thus be expressed as a single resultant operator. However, designing a quantum circuit in terms of constituent gates allows the design to conform to standard sets of gates, and thus enable greater ease of deployment. A quantum circuit thus corresponds to a design for a physical circuit in a quantum computer.

Gates can operate on any number of qubits, although one-qubit gates and two-qubit gates are common. Examples of one-qubit gates include the Pauli X, Y, and Z gates, which act on a single qubit and correspond to a rotation around the X, Y, or Z axis of the Bloch sphere of the qubit. One example of a two-qubit gate is a matchgate, which is defined by a 4×4 matrix. It will be appreciated that additional two-qubit gates may be defined by 4×4 unitary matrices, or in terms of their constituent rotations.

In the physical system, qubits can represent the ground state, $|0\rangle$, the excited state, $|1\rangle$, or a superposition of the two. The state of a qubit can be represented by a vector composed as a linear combination of the two basis vectors. Using Dirac notation, the state $|\Psi\rangle$ of a qubit can be described as in Equation 1 where $\alpha$ and $\beta$ are complex (c) numbers and are normalized as $$|\alpha_1|^2 + |\beta_1|^2 = 1. \qquad \text{Equation 1}$$

$$|\Psi_1\rangle = \alpha_1|0\rangle + \beta_1|1\rangle$$

Analogusly, for a general two-qubit state, Equation 2 holds, with $|\alpha_2|^2+|\beta_2|^2+|\gamma_2|^2+|\delta_2|^2=1$.

$$|\Psi_2\rangle = \alpha_2|00\rangle + \beta_2|01\rangle + \gamma_2|10\rangle + \delta_2|11\rangle \qquad \text{Equation 2}$$

In a quantum computation, the state of a qubit $|\Psi_{1/2}\rangle$ can be manipulated and controlled by quantum gates, which are correspond to matrix operations applied to the quantum state.

Figure 1:
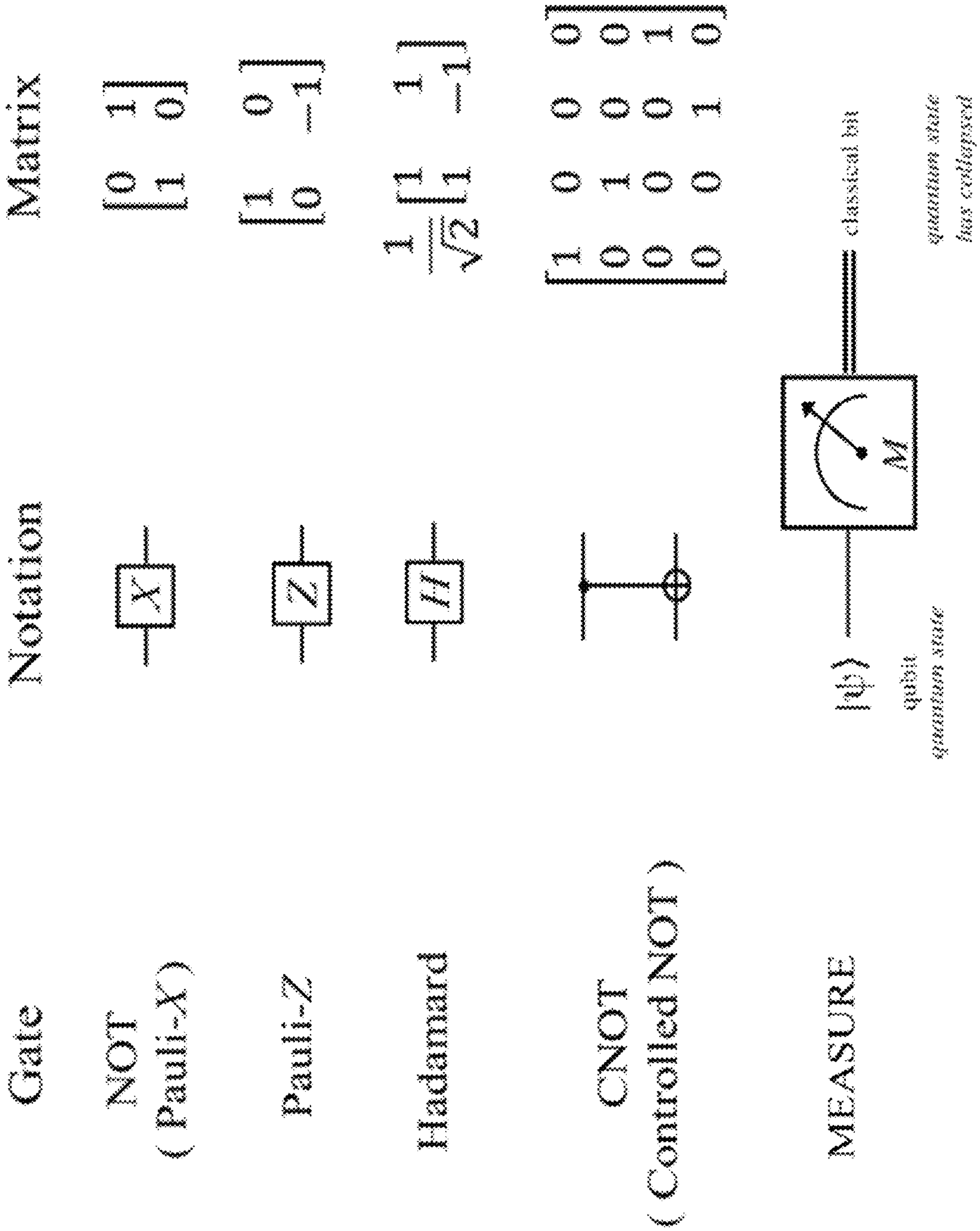
FIG. 1 is a schematic view of various exemplary quantum gates in both standard notation and matrix form.

Referring to FIG. 1, various exemplary quantum gates are illustrated in both standard notation and matrix form.

These quantum gates operate on either single qubits (e.g., Hadamard gate, X gate, or PHASE gate) or multiple qubits (e.g., Controlled NOT gate, SWAP gate, or Controlled PHASE gate). Certain multi-qubit gates require specification of a control qubit and a target qubit. For example, the Controlled NOT (CNOT) gate flips the state of the target qubit, represented as $\oplus$, through a NOT gate, conditional on the control qubit, represented as •, being set to the basis state $|1\rangle$.

Along with their respective circuit diagram notations, other single-qubit gates include qubit rotations (Pauli-Z), mixed-state preparations (Hadamard), and the MEASURE gate which collapses a qubit's quantum state to a classical bit state (either $|0\rangle$ or $|1\rangle$). The gates in FIG. 1 are not representative of all quantum gates, but they are some of the most commonly used gates in quantum computing.

For example, a SWAP instruction applied to two qubits a and b moves the data stored in qubit a to qubit b and vice versa. SWAPs may be implemented by, e.g., 3 CNOTs.

Quantum algorithms are represented by quantum circuits. A quantum circuit consists of logical qubits that are initialized to a specified initial state from which they will be manipulated and/or entangled through a series of quantum gates, with the goal of solving a computational problem through the information contained in their resulting state(s). Quantum circuits can be described in several ways: using a high-level quantum language such as Scaffold or Quipper, a quantum assembly/instruction language such as IBM's OpenQASM 2.0 or Rigetti Computing's QUIL, or using circuit diagrams. Various quantum circuits are described herein using circuit diagrams, but when dealing with software and compilers, quantum circuits are best represented in one of the listed languages above.

Figure 2:
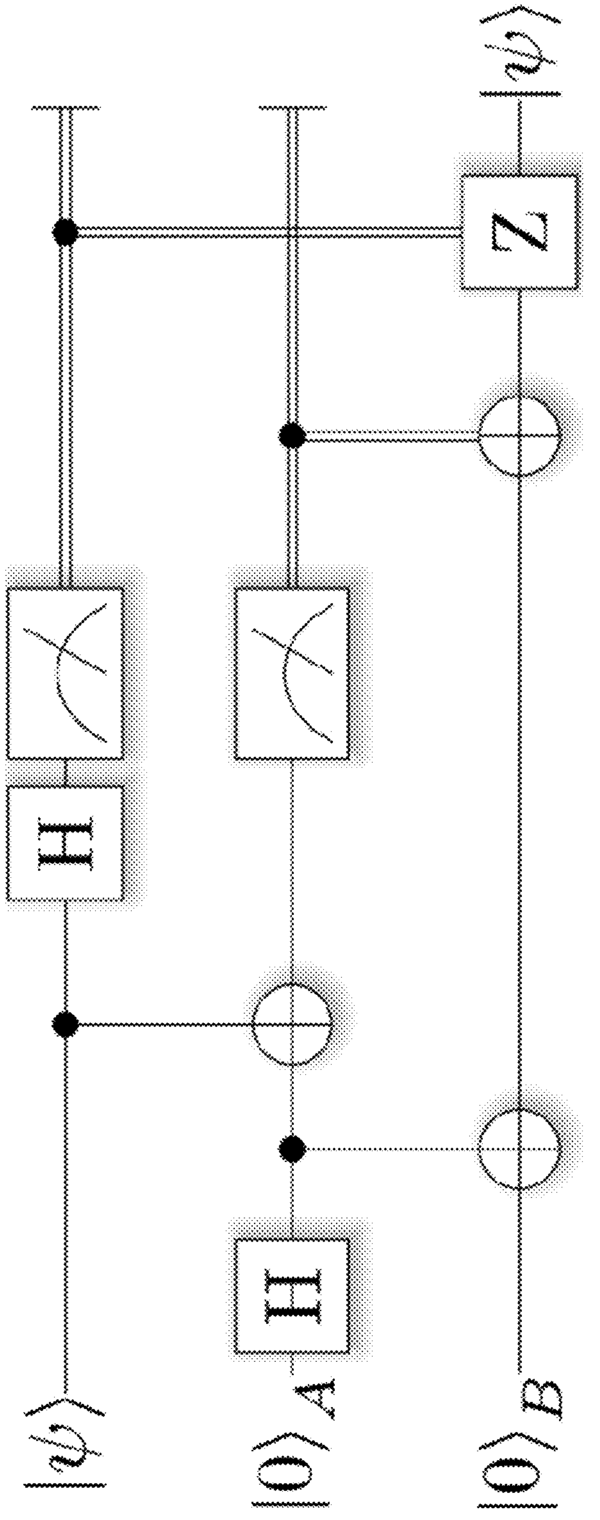
FIG. 2 is a schematic view of the quantum teleportation circuit.

In diagram format, each rail (horizontal line) represents a different logical qubit, and the sequence in which the gates are applied to the qubits is simply from left to right. An example of this notation is provided in FIG. 2, with respect to the quantum teleportation circuit. It involves 3 logical qubits, and the goal of the circuit is to transfer the quantum state $|\psi\rangle$ from the first logical qubit to the third. The dual rails represent classical bits because after the two measurement gates on the first two qubits, their states collapse into a classical state, either $|0\rangle$ or $|1\rangle$, from which the computer will decide to apply a NOT gate or a Pauli-Z gate to the third logical qubit.

Consider the infinite temperature two-time correlation function, Equation 3, of an operator O, undergoing dynamics according to Hamiltonian H.

$$S(t) = \frac{1}{Tr[\mathbb{1}]} Tr\left[e^{iHt} O e^{-iHt} O\right] \qquad \text{Equation 3}$$

In particular, the interest is to obtain samples out of its spectral function, Equation 4, where y is the effective linewidth.

$$\sum_{\gamma}(\omega) = \mathrm{Re}\int_0^{\infty} dt e^{-\omega t - \gamma t} S(t) \qquad \text{Equation 4}$$

We proceed by purifying a normalized version of the operator $O^2$, acting on the Hilbert space $\mathcal{H}$, into a pure state one an extended Hilbert space $\mathcal{H}\otimes\mathcal{H}$, Equation 5, where $O_i$ and $|i\rangle$ are the eigenvalues and eigenvectors of O respectively.

$$|O\rangle = \mathcal{N}^{-1/2}\sum_{i=1}^{2^N} O_i|i\rangle \otimes |i\rangle \qquad \text{Equation 5}$$

The normalization is simply $N=TrO^2$. Next, perform quantum phase estimation on the unitary which propagates one of the two copies with the actual Hamiltonian H and the other copy with −H, such that a phase difference accumulates between the copies over time. If we denote H as in Equation 6, then quantum phase estimation on the state $|0\rangle$, results in the state of Equation 7, with $c_{n,m}$ as in Equation 8.

$$H = \sum_{n=1}^{2^N} \epsilon_n |E_n\rangle\langle E_n| \qquad \text{Equation 6}$$

$$|\Psi\rangle = \sum_{n,m=1}^{2^N} 2^{-l/2} \sum_{x=0}^{2^l-1} c_{n,m} e^{i\Delta(\epsilon_n - \epsilon_m)x} |E_n\rangle \otimes |E_m\rangle \otimes |x\rangle \qquad \text{Equation 7}$$

$$c_{n,m} = \frac{\sum_i \langle E_n \mid i\rangle\langle E_m \mid i\rangle O_i}{\sqrt{N}} \qquad \text{Equation 8}$$

Here l denotes the number of ancilla qubits used to perform the quantum phase estimation and $|x\rangle$ denotes the computational basis state of the ancilla given by the binary representation of x, e.g., x=2 implies $|0 \ldots 010\rangle$. Finally, $\Delta$ denotes the effective time for which the control (phase estimation) qubit is coupled to the system. See FIG. 3 for a circuit representation. Performing an inverse quantum Fourier transform on this state, one arrives at Equation 9, with $$A^k_{n,m}$$

as in Equation 10.

$$|\Psi_{QFT}\rangle = \sum_{n,m=1}^{2^N} \sum_{k=0}^{2^l-1} c_{n,m} A^k_{n,m} |E_n\rangle \otimes |E_m\rangle \otimes |k\rangle \quad \text{Equation 9}$$

$$A^k_{n,m} = \frac{1}{2^l} \sum_{x=0}^{2^l-1} \exp\left[i\frac{2\pi}{2^l}\left(\frac{\Delta 2^l}{2\pi}(\epsilon_n - \epsilon_m) - k\right)x\right] \quad \text{Equation 10}$$

Figure 3:
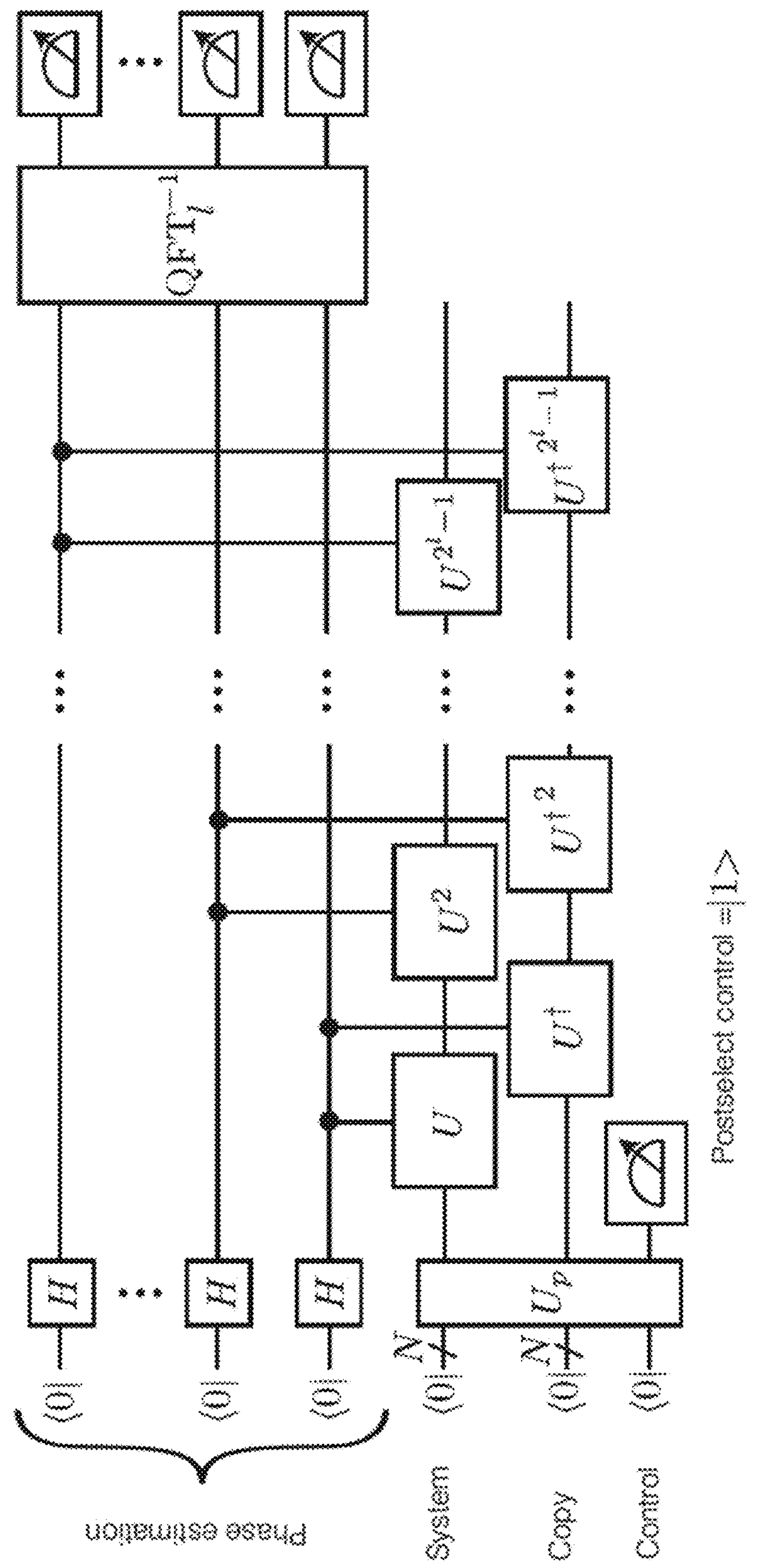
FIG. 3 is a schematic view of a quantum circuit illustrating quantum phase estimation on a purified operator. The purified state can be prepared by entangling two copies with an ancilla control qubit and post-selecting the result on outcomes $|1\rangle$, see FIG. 4. A phase difference between the two copies appears because each phase estimation bit propagates one copy according to U and the other as $U^{\dagger}$. The output distribution after quantum Fourier transform is the spectral function.

Finally a measurement is performed on the phase estimation qubits in the computational basis, see FIG. 3. The probability to find the control bits in state $|f\rangle$ is simply given by:

$$P(f) = \sum_{n,m=1}^{2^N} |c_{n,m}|^2 |A^f_{n,m}|^2 \quad \text{Equation 11}$$

Assuming time-reversal symmetry of the Hamiltonian H and operator O, one finds $$|c_{n,m}|^2 = \frac{|\langle E_n|O|E_m\rangle|^2}{Tr[O^2]} \quad \text{Equation 12}$$

Exactly the (normalized) golden rule transition rate between energy eigenvectors. Moreover, the second part in Equation 11 is a function that concentrates around $f=\Delta 2^l(\varepsilon_n-\varepsilon_m)/2\pi$, i.e., Equation 13 with $\mathrm{sinc}(x)=\sin(\pi x)/\pi x$.

$$|A^f_{n,m}|^2 = \frac{1}{4^l}\frac{\sin^2\left[\pi\left(\frac{\Delta 2^l}{2\pi}(\epsilon_n - \epsilon_m) - f\right)\right]}{\sin^2\left[\frac{\pi}{2^l}\left(\frac{\Delta 2^l}{2\pi}(\epsilon_n - \epsilon_m) - f\right)\right]} \geq \mathrm{sinc}^2\left[\frac{\Delta 2^l}{2\pi}(\epsilon_n - \epsilon_m) - f\right], \quad \text{Equation 13}$$

Consequently, for carefully chosen parameters the output distribution of the phase estimation qubits is exactly the desired spectral function: $P(f)\sim\Sigma_\gamma(\omega\Delta 2^l/2\pi|\theta)$. A proper spectral measurement requires:

$$\frac{1}{\gamma} \leq \frac{\Delta 2^l}{2\pi} \leq \frac{2^l - 1}{\omega_{max}} \quad \text{Equation 14}$$

The first inequality expresses the fact that there is no need to resolve frequencies at a better level than the effective linewidth $\gamma$. The second simply states that a minimal amount of bits are required to resolve the bandwidth $\omega_{max}=\max(\varepsilon_n-\varepsilon_m)$. With l bits, there are $2^l$ configurations while the number of distinguishable peaks is $\sim\omega_{max}/\gamma$, consequently the number of bits should scale like $$l \propto \log\frac{\omega_{max}}{\gamma} \quad \text{Equation 15}$$

For any problem in which the bandwidth scales polynomial with the system size N and for which the linewidth decreases algebraically in the system size, the number of phase estimation qubits scales logarithmically in N. Note that this is the case in almost all physically relevant situations. First, for local models, the bandwidth simply scales linearly in the system size and even systems with all-to-all interactions only have quadratic scaling of the bandwidth with system size. Second, with a few exceptions, one is typically only interested in studying the behavior of the system for a time T which is polynomial in the system size. In that case, an algebraically small linewidth should be sufficient. Finally, $\Delta\approx 2\pi/\omega_{max}$, which is not unreasonable for polynomial bandwidth. Note that it appears that we need O(l) gates to apply the controlled unitaries in FIG. 3, however all those gates commute and can in principle be done in parallel. The last gate can nonetheless not be implemented in the same physical time as the first, while the first gate only takes a time $O(\Delta)$ the last gate requires a time of $O(\gamma)$. A standard implementation of QFT takes $O(l^2)$ gates, but more sophisticated versions only require O(l log l) gates. Therefore the computational time scales is at worst $O(\gamma^{-1}+l^2)$ or $O(\omega_{max}/\gamma+l^2)$ if one has to decompose the Hamiltonian H into two-qubit gates.

Initial state preparation. The efficiency of the above procedure hinges on the ability to prepare the initial state $|O\rangle$. We provide an explicit probabilistic method to prepare $|O\rangle$ out of a product state by postselecting on the measurement outcome of an ancilla qubit. First of all, note that, if operator O would be of low rank, the above procedure would be superfluous. In the latter case, one could simply extract the two-point Equation 3 by evolving each of the eigenvectors of O. Only rk(O) states would have to be propagated, so it can be done in polynomial time as long as the rank is polynomial in the system size. We wish to obtain a method for operators that have no, or only small, rank deficiency.

Let us start by preparing a maximally entangled pair state, Equation 16, and try to project the system to the desired state $|O\rangle$; note that $|O\mathcal{H}\propto O\otimes\mathbb{1}|\psi_{EP}\rangle$.

$$|\psi_{EP}\rangle = \sum_{i=1}^{2^N} \frac{1}{\sqrt{2^N}}|z_i\rangle|z_i\rangle \quad \text{Equation 16}$$

Figure 4:
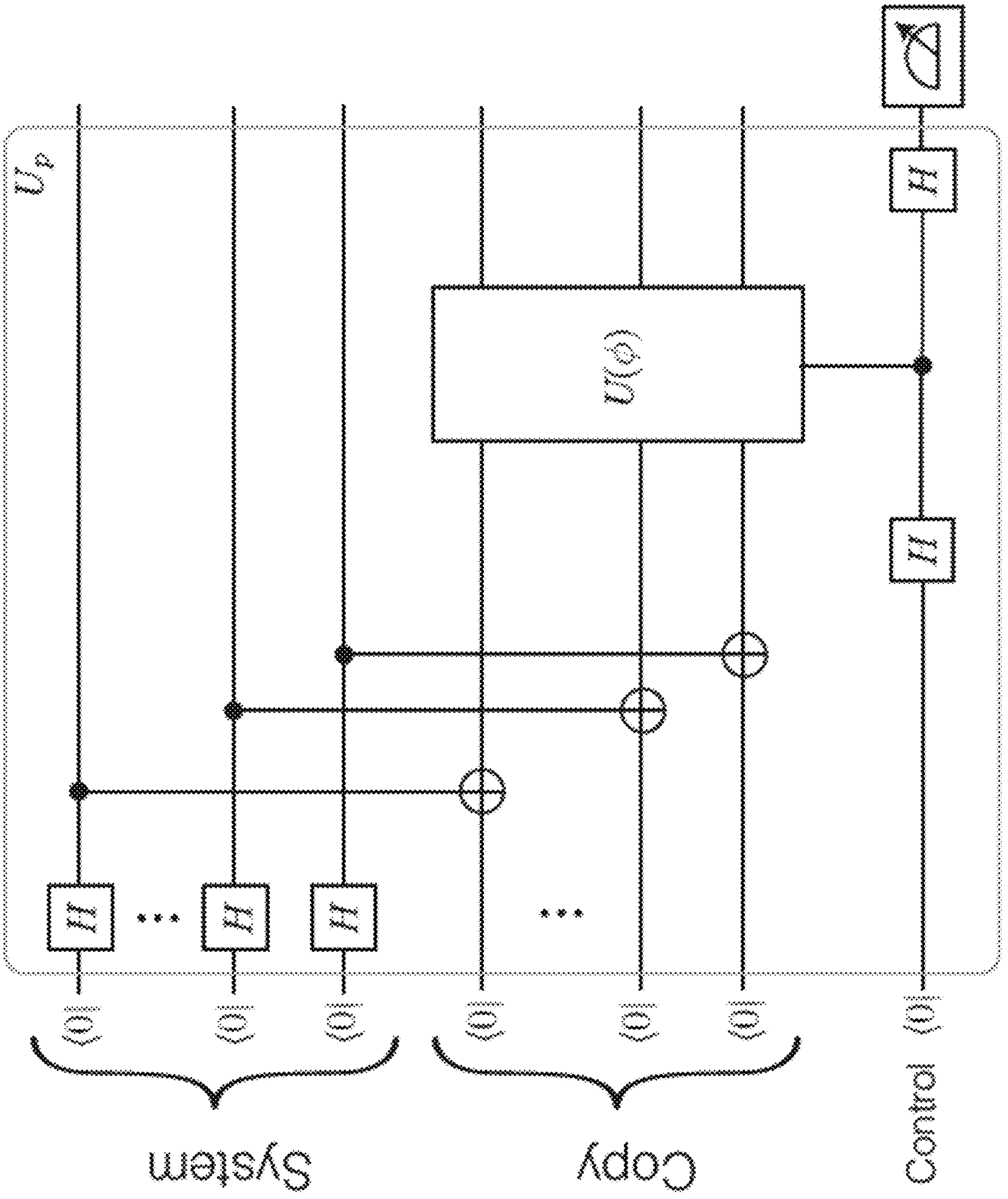
FIG. 4 is a schematic view of a quantum circuit illustrating a state preparation scheme. An initial entangled pair states is created between two N-qubit registers. Next, one of the two copies is connected to an ancilla control qubit, which is placed in an equal superposition of z-states, both are evolved for some time $\phi$ under the Hamiltonian, $$H = O(\sigma_a^z + 1)/2.$$

The creation of the entangled pair state $|\psi_{EP}\rangle$ is a product state of Bell pairs between the system and its copy. It can be constructed out of a product state in constant time, see FIG. 4.

A single control qubit can now be used to apply a controlled unitary rotation, with the action on the system being:

$$U(\phi) = \exp(i\phi O) \otimes \mathbb{1} \quad \text{Equation 17}$$

By applying a Hadamard gate on the control bit before and after U, the combined state becomes:

$$|\psi\rangle = \frac{1}{2}(1 + U(\phi))|\psi_{EP}\rangle|0\rangle + \frac{1}{2}(1 - U(\phi))|\psi_{EP}\rangle|1\rangle \quad \text{Equation 18}$$

Measuring the control qubit in the computational basis, one finds it in the $|1\rangle$ state with probability $$P_1(\phi)=\langle\psi_{EP}|\sin^2(\phi O/2)|\psi_{EP}\rangle \quad \text{Equation 19}$$

At the same time, the fidelity between the target state $|O\rangle$ and the postselected state $|\psi_1\rangle$ becomes as in Equation 20, where the averages are in the infinite temperature state $\psi_{EP}$, without loss of generality we assumed O to be traceless.

$$F(\phi)=|\langle O|\psi_1\rangle|^2=\frac{|\langle OU(\phi)\rangle|^2}{\langle O^2\rangle\langle 4\sin^2(\phi O/2)\rangle} \quad \text{Equation 20}$$

The fidelity tends to 1 when $\phi\rightarrow 0$, however, at the same time the acceptance probability also goes down. To be efficient, we need to achieve a fidelity $F=1-\epsilon$ with a probability that is at worst algebraically small in N. For sufficiently small $\phi$, we find Equation 21, with F as in Equation 22.

$$P_1=\frac{\phi^2}{4}\langle O^2\rangle+O(\phi^4) \quad \text{Equation 21}$$

$$F=1-\frac{\phi^2}{4}\left(\frac{\langle O^4\rangle}{\langle O^2\rangle}-\frac{\langle O^3\rangle^2}{\langle O^2\rangle^2}\right)+O(\phi^4) \quad \text{Equation 22}$$

Consequently, as long as higher order contributions can be neglected, one gets a fidelity better than $1-\epsilon$ by setting $\phi^2\epsilon\langle O^2\rangle/\langle O^4\rangle$, resulting in success with probability given in Equation 23 where $O_{max}$ is the largest singular value of O and $O_{min}$ is the smallest non-zero singular value.

$$P_1\approx\epsilon\frac{\langle O^2\rangle^2}{\langle O^4\rangle}\geq\frac{\langle O^2\rangle}{O_{max}^2}\geq\epsilon\frac{rk(O)}{2^N}\left(\frac{O_{min}}{O_{max}}\right)^2 \quad \text{Equation 23}$$

For most physical observables, such as those comprised of sums of local terms, the fourth moment simply scales as the square of the second, i.e., $\langle O^4\rangle\propto\langle O^2\rangle^2$. Hence, for all those observables the state can be prepared in a constant time of $O(1/\epsilon)$. Additionally, it's sufficient that the operator only has polynomial rank deficiency and polynomial scale separation between its smallest and largest singular value, to be able to generate the state in polynomial time.

Even at infinite temperature, the dynamical properties of operators evolving under a many-body Hamiltonian are theoretically interesting. In particular their spectral function provides information about the universal behavior of the system. Both the high and low frequency behavior of the spectral function is universal and while the former gives insight into the Lyapunov exponent of the operator, the latter provides information about the diffusion constant.

Apart from theoretical interest, there is at least one relevant problem which is effectively at infinite temperature, namely nuclear magnetic resonance (NMR) spectroscopy. In NMR one measures the response of the nuclear spins of system placed in high magnetic field to an external drive, i.e., $$O=\sum_{i=1}^{N}\sigma_i^z.$$

These systems are not isolated from the environment, yet have relatively long but finite coherence time. As a consequence, $\gamma$ is finite and $P_1\sim 1/\epsilon$ and the entire algorithm runs in a time $t=O(\epsilon^{-1}+\gamma^{-1}+l^2)$, which to leading order in N is $\log^2 N$.

Finally, it's interesting to extend the present results to finite and zero temperature. There was nothing specific about the phase estimation scheme, one simply has to purify a different operator. At zero temperature, Equation 5 has to be replaced with $$|O\rangle_0=\frac{1}{\sqrt{\langle O^2\rangle}}O|\psi_0\rangle\otimes|\psi_0\rangle \quad \text{Equation 24}$$

If the ground state $|\Psi_0\rangle$ can be efficiently prepared, the preparation of $|O\rangle_o$ might continue as before, with a similar success rate. One only has to replace the expectation in Equation 19 with ground state expectation values. Consequently, for local observables we still expected $P_1=O(1/\epsilon)$. Note that the state $|O\rangle_o$ is a product state between the system and the copy, hence the copy only serves as a reference for the phase. If one knows the ground state energy, or doesn't care about shifts in the spectrum, one can eliminate the copy entirely. Finally, in order to sample from any finite temperature spectral function, one simply has to replace the maximally entangled pair state $|\psi_{EP}\rangle$ with the less entangled purification of a Gibbs state, Equation 25, such that $|O\rangle_\beta\propto O|\psi_\beta\rangle$; it clearly tends to the zero and infinite temperature state for large and small $\beta$ respectively.

$$|\psi_\beta\rangle=Z^{-1/2}\sum_n e^{-\beta\epsilon_n/2}|E_n\rangle\otimes|E_n\rangle \quad \text{Equation 25}$$

If the purified Gibbs state can be made effciently, the algorithm is just as efficient as before. Whether or not this is possible, depends entirely on the problem at hand, a QMA-complete problem might have been embedded in the Hamiltonian, implying it can not take less then exponential time. On the other hand, many physically relevant problems are expected to be less hard. At zero temperature, one can imagine an adiabatic preparation procedure and as long as there is no exponential gap closing this should work in polynomial time. For $|\psi_\beta\rangle$, one might have to resort to numerical optimal control methods to find efficient state preparation schemes.

Recent technological advances may lead to the development of small scale quantum computers capable of solving problems that cannot be tackled with classical computers. A limited number of algorithms has been proposed and their relevance to real world problems is a subject of active investigation. Analysis of many-body quantum system is particularly challenging for classical computers due to the exponential scaling of Hilbert space dimension with the number of particles. Hence, solving problems relevant to chemistry and condensed matter physics are expected to be the first successful applications of quantum computers. In this paper, we propose another class of problems from the quantum realm that can be solved effciently on quantum computers: model inference for nuclear magnetic resonance (NMR) spectroscopy, which is important for biological and medical research. Our results are based on the cumulation of three interconnected studies. Firstly, we use methods from classical machine learning to analyze a dataset of NMR spectra of small molecules. We perform a stochastic neighborhood embedding and identify clusters of spectra, and demonstrate that these clusters are correlated with the covalent structure of the molecules. Secondly, we provide an efficient method, aided by a quantum simulator, to extract the NMR spectrum of any hypothetical molecule described by a parametric Heisenberg model. Thirdly, we provide an efficient variational Bayesian inference procedure for extracting Hamiltonian parameters of experimentally relevant NMR spectra.

One of the central challenges for quantum technologies during the last few years has been a search for useful applications of near-term quantum machines. While considerable progress has been achieved in increasing the number of qubits and improving their quality, in the near future, we expect the number of reliable gates to be limited by noise and decoherence; the so called Noisy Intermediate-Scale Quantum (NISQ) era. As such, hybrid quantum-classical methods may be used to make the best out of the available quantum hardware and supplement it with classical computation. For example, algorithms can use the quantum computer to prepare variational states, some of which might be inaccessible through classical computation, but use a classical computer to update the variational parameters.

For simple models one can find the likelihood and maximize it but for complex models the likelihood is typically intractable. Nuclear magnetic resonsnace (NMR) spectroscopy is a good example: there is a good understanding of the type of model that should be used (see Equation 26) and one only needs to determine the appropriate parameters. However, computing the NMR spectrum for a specific model requires performing computations in the exponentially large Hilbert space, which makes it extremely challenging for classical computers.

This feature provides a motivation for proposing NMR as a platform for quantum computing. While it has been shown that no entanglement is present during NMR experiments, strong correlations make it classically intractable. Its computational power is between classical computation and deterministic quantum computation with pure states, which makes it an ideal candidate for hybrid quantum-classical methods. By simulating the model on a quantum computer, it runs efficiently while the remaining inference part is solved on a classical computer. One can think of this as an example of quantum Approximate Bayesian Computation (qABC), putting it in the broader scope of quantum machine learning methods. In contrast to alternative quantum machine learning applications, the present algorithm does not require challenging routines such as amplitude amplification or Harrow-Hassidim-Lloyd (HHL) algorithm.

NMR spectroscopy is a spectroscopic technique which is sensitive to local magnetic fields around atomic nuclei. Typically, samples are placed in a high magnetic field while driving RF-transitions between the nuclear magnetic states of the system. Since these transitions are affected by the intramolecular magnetic fields around the atom and the interaction between the different nuclear spins, one can infer details about the electronic and thus chemical structure of a molecule in this way. One of the main advantages of NMR is that it is non-destructive, in contrast to, for example, X-ray crystallography or mass spectrometry. This makes NMR one of the most powerful analytical techniques available to biology, as it is suited for in vivo and in vitro studies. NMR can, for example, be used for identifying and quantifying small molecules in biological samples (serum, cerebral fluid, etc.). On the other hand, NMR experiments have limited spectral resolution and as such face the challenge of interpreting the data, since extracted information is quite convoluted. We only directly observe the magnetic spectrum of a biological sample, whereas our goal is to learn the underlying microscopic Hamiltonian and ultimately identify and quantify the chemical compounds. While this inference is tractable for small molecules, it quickly becomes problematic, making inference a slow and error-prone procedure. The analysis can be simplified by incorporating a priori spectral information in the parametric model. For that purpose, considerable attention has been devoted to determining NMR model parameters for relevant metabolites such as those found in plasma, cerebrospinal fluid and mammalian brains.

In what follows we will be concerned with 1D proton NMR but generalization to other situations are straightforward. For liquid $^1$H-NMR, a Heisenberg Hamiltonian, Equation 26, $$H(\theta)=\sum_{i,j}J_{ij}S_i\cdot S_j+\sum_i h_i S_i^x \quad \text{Equation 26}$$

yields a reasonable effective description for the nuclear spins, where θ explicitly denotes the dependence of the Hamiltonian on its parameters $\theta=\{J_{ij}, h\}$. Here $J_{ij}$ encodes the interaction between the nuclear spins S and $h_i$ is the effective local magnetic field. Note that this Hamiltonian contains two essential approximations (i) the interactions are chosen to SU(2) invariant and (ii) the local magnetic fields—called chemical shifts in the NMR literature—are unidirectional. The rationale for the latter is that most of these local magnetic fields are caused by diamagnetic screening due to electronic currents induced by the large external magnetic field. This field will tend to oppose the external field and hence be largely uniaxial. For liquid state NMR, the rapid tumbling of the molecules averages out the dipar coupling between the nuclei, approximately resulting in isotropic exchange interactions between nuclear spins. The fact that the interactions are rotationally invariant, allows us to remove the average (external) field from the Hamiltonian, i.e., $$S_{tot}^x=\sum_i S_i^x$$

commutes with Hamiltonian (Equation 26) and will therefore only shift the NMR spectrum.

Within linear response the evolution of the system subject to a radio frequency z-magnetic field is determined by the response function, Equation 27, where $\rho_0$ denotes the initial density matrix of the system and $$S_{tot}^z=\sum_i S_i^z.$$

$$S(t|\theta)=Tr\left[e^{iH(\theta)t}S_{tot}^z e^{-iH(\theta)t}S_{tot}^z\rho_0\right] \quad \text{Equation 27}$$

The measured spectrum is given by Equation 28, where γ is the effective decoherence rate.

$$A(\omega|\theta)=\mathrm{Re}\int_0^\infty dt e^{i\omega t-\gamma t}S(t|\theta) \quad \text{Equation 28}$$

For room temperature $^1$H-NMR, the initial density matrix can be taken to be an infinite temperature state, i.e., $$\rho_0 \approx \frac{\mathbb{1}}{Tr[\mathbb{1}]} \qquad \text{Equation 29}$$

Indeed, even a 20 T magnetic field will only lead to a bare proton resonance frequency of about 900 MHz. In contrast, room temperature is about 40 THz, so for all practical purposes we can consider it equally likely for the spin to be in the excited state or in the ground state. Chemical shifts $h_i$ are of the order of a few parts per million, resulting in local energy shifts of a few kHz, while the coupling or interaction strength J is of the order of a few Hz. Despite these low frequencies and the high temperature of the system, one can typically still infer the parameters due to the small decoherence rate of the proton nuclear spin. Due to the absence of a magnetic quadrupole moment, the protons do not decohere from the electric dipole fluctuations caused by the surrounding water molecules. This gives the proton nuclear spin a coherence time of the order of seconds to tens of seconds, sufficiently long to create some correlations between the various spins. The below discussion is concerned with the question of how to infer the model parameters $J_{ij}$ and $h_i$ of our effective Hamiltonian (Equation 26) from a measured spectrum (Equation 28).

Given real NMR data, summarized by the experimentally acquired spectrum $\mathcal{A}(\omega)$, our goal, in general, is to learn a parametrized generative model which explains how this NMR data is generated. Fortunately, we have a good idea about the physics which allows us to write down a model, Equation 28, that is close to reality thereby ensuring a small misspecification error. The drawback however is that the model is analytically intractable and becomes increasingly complex to simulate with increasing number of spins. Below, we will discuss how to alleviate this problem by using a programmable quantum simulator to simulate the problem instead. Even if we can simulate our model (Equation 28), we still have to find a reliable and robust way to estimate the parameters θ. Physical molecules have far from typical parameters θ, see SI for a mathematical description. After all, if they do not, how could we infer any structural information out of the spectrum? As a proof of concept, we show an application of classical learning for predicting chemical structures of molecules with four spins. To extract NMR spectral features, we first perform unsupervised learning on a dataset containing 69 small organic molecules, all composed out of 4 $^1$H-atoms, observable in NMR 1D-1H experiments. Their effective Hamiltonian parameters θ have previously been determined, which provides us with a labeled dataset to test our procedure.

Furthermore, by only using the spectra themselves, we can use any relevant information as an initial prior for inference on unknown molecules. The dataset was compiled using the GISSMO library. In order to extract the structure in the dataset, we perform a t-distributed stochastic neighborhood embedding (t-SNE) to visualize the data in 2 dimensions. The idea of t-SNE is to embed high-dimensional points in low dimensions in a way that respects similarities between points, like principal component analysis (PCA). Nearby points in the high-dimensional space correspond to nearby embedded 2-dimensional points, while distant points in the high-dimensional space are mapped to distant embedded 2D points. In general, it is impossible to faithfully represent all high-dimensional distances in low dimensions, e.g., there are many more mutually equidistant points in high-dimensions. In contrast to PCA, which simply linearly projects the data on a low dimensional hyperplane, t-SNE is designed to only care about preserving local distances allowing distortion of large distances.

This distortion partially combats the basic problem that there is simply not enough volume in low dimensions. FIG. 6B shows the 2-dimensional t-SNE embedding of the dataset based on the Hellinger distance shown in FIG. 6A, a detailed comparison of different metrics is presented in the SI. The colorscale in panel B shows the inverse participation ratio of each sample, Equation 30, a measure for the total number of transitions that contribute to the spectrum.

$$IPR = \frac{\int_{-\infty}^{\infty} d\omega A(\omega \mid \theta)}{\int_{-\infty}^{\infty} d\omega A^2(\omega \mid \theta)} \qquad \text{Equation 30}$$

At least 4 well defined clusters are identified. Using the clusters as indicated in FIG. 6B, we can sort the molecules per cluster and have a look at the spectra. The sorted distance matrix is shown in FIG. 7A, it clearly shows we managed to find most of the structures in the system. In fact a closer look at the spectra of each of the clusters indeed reveals they are all very similar. FIG. 7B shows a representative spectrum for each of the clusters, as expected the IPR goes up if we go from cluster one to cluster four. All spectra in cluster 1 have the property of containing two large peaks and two small peaks, where the larger peak is about three times higher than the small peak. This is indicative of molecules with a methyl group (CH3) with its protons coupled with a methine proton (CH). One example of such structures can be seen in acetaldehyde oxime (BMRB ID: bmse000467) (as shown to the left in FIG. 7B). The fact that the 3 protons are equivalent results in the 3:1 ratio of the peaks. Molecules from cluster 2 have a sub-structure similar to the 1,4-Benzoquinone molecule shown FIG. 7B. They are highly symmetric and have two pairs of two methine protons (CH) where the protons are on neighboring carbon atoms. The symmetry in the molecule makes the spectrum highly degenerate.

In contrast, cluster 3 has molecules where there are two neighboring methylene groups (CH2). The interacting splitting causes a spectrum as shown in FIG. 7B. Finally, cluster 4 has four inequivalent protons with different chemical shifts and interactions between them. As a results, there is a plethora of possible transitions and the spectrum has an erratic form such as shown in FIG. 7B. In that sense, cluster 4 is most like a disordered quantum spin chain.

Given a new spectrum of an unknown molecule we can clearly find out whether the molecule belongs to any of the identified molecular sub-structures. Moreover, even if it is not in the dataset, the high degree of clustering will allow us to easily place the spectrum within one of the clusters. Since we know the spin matrix $\theta_i$ for each of the molecules in the dataset, we have a rough estimate of what the Hamiltonian parameters are and where the protons are located with respect to each other. However, there is still a lot of fine structure within clusters, in particular in clusters 3 and 4, as can be seen in FIG. 7A. In what remains, we are concerned with finding an algorithm to further improve the Hamiltonian parameter estimation.

While our model is microscopically motivated, thereby capturing the spectra very well and allowing for a physical interpretation of the model parameters, it has the drawback that, unlike simple models such as Lorentzian mixture models, there is no analytic form for the spectrum in terms of the model parameters. Moreover, even simulating the model becomes increasingly complex when the number of spins increase. Before we solve the inference problem, let us present an efficient method to extract the simulated NMR spectrum on a quantum simulator-computer. The basic task is to extract the spectrum (Equation 28) by measuring (Equation 27). Recall that we work at infinite temperature, hence by inserting an eigenbasis of the total z-magnetization $$S^z_{tot} = \sum_i m_j |z_j\rangle\langle z_j|,$$

we find Equation 31, where $m_j$ is the total z-magnetization in the eigenstate $|z_j\rangle$.

$$S(t\,|\,\theta) = \sum_{j=1}^{2^N} \frac{m_j}{2^N} \langle z_j| e^{iH(\theta)t} S^z_{tot} e^{-iH(\theta)t} |z_j\rangle \quad \text{Equation 31}$$

Consequently, we can extract the spectrum by initializing our system in a product state of z-polarized states after which we quench the system to evolve under the Hamiltonian H(θ), and then finally measure the expectation value of $$S^z_{tot}$$

at time t. By repeating the procedure for various initial eigenstates and weighting the results by the initial magnetization $m_j$, we obtain an estimate of S(t|θ). While intuitive and simple, this naïve procedure has an exponential sampling cost and is therefore extremely inefficient. Fortunately, due to the massive degeneracy of the $$S^z_{tot}$$

operator and some remaining $\mathbb{Z}_2$ symmetry of the Hamiltonian (Equation 26), we can reduce the sampling down to O(N/2) samples rather than $O(2^N)$.

The basic idea is to prepare a random state in the subspace of fixed z-magnetization such that the sampling over all the states at fixed magnetization can be replaced by averaging over realization of the random state. Such states can be efficiently prepared using Hamiltonians that scramble information quickly, moreover fluctuations from the mean are exponentially suppressed in N such that it's sufficient to average over O(1) different Hamiltonians. A detailed analysis is given below. The entire procedure is schematically depicted in FIG. 8. It only requires N qubits. Obtaining S(t|θ) at a fixed time t will require sampling O(N) random initial states with fixed total z-magnetization. These states can be prepared by randomizing initial product states with a fixed $$S^z_{tot}$$

using a fast scrambling unitary $U_{mix}$, as shown in FIG. 8.

Next, we propagate each state with the physical Hamiltonian H(θ) for fixed time t. Since the mixing takes $O(\log^c(N))$, this will take $O(N\times(t+\alpha \log^c N))$ with c a constant of O(1). In order to construct the full spectrum, we will have to measure at various times t. Given the finite decoherence rate, samples only have to be collected up to a maximum time O(1/γ), while the spectral norm of the system typically increases linearly in the number of spins. Taking samples at the Nyquist frequency, we will have to collect O(N) time samples, leading to a final scaling $O(N^2 \log^c N)$ to obtain a simulated NMR spectrum.

Now that we have a procedure of efficiently obtaining spectra of hypothetical molecules, how do we solve the inference problem? On approach would be to do maximum likelihood estimation of the parameters given the experimental spectrum or minimize one of the aforementioned cost functions. This cannot be done analytically and the problem can clearly be highly non-convex. We thus require a method to numerically minimize the error; gradient descend is unsuitable for this task. Aside from the additional resources that will have to be devoted to computing the actual gradient, there is a far more severe problem. Using a quantum simulator, one only obtains a statistical estimate of the cost function and its gradient since we only perform a finite number of measurements. In order to move down the optimization landscape we thus need to resolve the signal from the noise, meaning gradients have to be sufficiently large to be resolved. However, we find extremely small gradients for this problem. Taking for example the Hellinger distance, $D_H$, used to construct FIG. 6, we find the gradient satisfies Equation 32 where $I_{\theta\theta}$ is the diagonal component of the Fisher information.

$$|\partial_\theta D_H^2| = \left| \int \frac{d\omega}{2\pi} \sqrt{\frac{\mathcal{A}(\omega)}{A(\omega\,|\,\theta)}}\, \partial_\theta A(\omega\,|\,\theta) \right| \leq \sqrt{I_{\theta\theta}} \quad \text{Equation 32}$$

The bound simply follows from Cauchy-Schwarz inequality. As shown below, the Fisher information, even for the optimal values, is very small; typically of the order $10^{-4}$–$10^{-6}$ for our 4 spin molecules. We are thus in a situation of a very shallow rough optimization landscape. The problem is of similar origin as the vanishing gradient problem in quantum neural networks. A gradient free method seems advisable but simple heuristic methods such as simplex or pattern search seem to fail. We therefore adopt a Bayesian approach to update our estimated parameters. Recall Bayes theorem, in the current notation, reads as in Equation 33, where P(θ|ω) is the conditional probability to have parameters θ given that we see spectral weight at frequency ω, A(ω|θ) is the NMR spectrum for fixed parameters θ, P(θ) is the probability to have parameters θ and A(ω) is the marginal NMR spectrum averaged over all θ.

$$P(\theta\,|\,\omega) = \frac{A(\omega\,|\,\theta)P(\theta)}{A(\omega)} \quad \text{Equation 33}$$

If we acquire some data, say a new spectrum $\mathcal{A}(\omega)$ and we have some prior believe about the distribution P(θ), we can use it to update our believe about the distribution of the parameters, giving Equation 34 with $A_i(\omega)=\int d\theta A(\omega|\theta)P_i(\theta)$.

$$P_{i+1}(\theta) = \int \frac{d\omega}{2\pi} \mathcal{A}(\omega) \frac{A(\omega\,|\,\theta)}{A_i(\omega)} P_i(\theta) \quad \text{Equation 34}$$

Note that the above rule indeed conserves positivity and normalization. Moreover, it simply reweights the prior distribution with some weight, Equation 35, that is directly related to the log-likelihood, since Jensen inequality gives Equation 36, where $\mathcal{L}(\theta)$ is the log-likehood and c is a constant independent of θ.

$$w_i(\theta) = \int \frac{d\omega}{2\pi} \mathcal{A}(\omega) \frac{A(\omega \mid \theta)}{A_i(\omega)} \quad \text{Equation 35}$$

$$\log(w_i(\theta)) \geq \int \frac{d\omega}{2\pi} \mathcal{A}(\omega) \log \frac{A(\omega \mid \theta)}{A_i(\omega)} = \mathcal{L}(\theta) + c \quad \text{Equation 36}$$

Consequently, iterating Equation 34 is expected to converge to a distribution of parameters which is highly peaked around the maximum likelihood estimate. While it avoids the use of any gradients, it requires us to sample from the current parameter distribution $P_i(\theta)$. This by itself could become intractable and so we make an additional approximation. In order to be able to sample from the parameter distribution, we approximate it by a normal distribution at every step. That is, given that we have obtained some Monte Carlo samples out of $P_i(\theta)$, we can estimate all the weights $w_i(\theta)$ by simply simulating the model and obtaining $A(\omega|\theta_i)$ for all the samples. Next, we approximate $P_{i+1}(\theta)$ with a normal distribution that is a close as possible to it, having minimal KL-distance. The latter is simply the distribution with the same sample mean and covariance as $P_{i+1}(\theta)$. We use an atomic prior, $$P_0(\theta) = \sum_i \frac{1}{N_s} \delta(\theta - \theta_i),$$

consisting of all the samples that belong to the same cluster to which the spectrum is identified to belong. The result of this procedure for some randomly chosen test molecules is shown in FIG. 9. We observe steady, albeit noisy, convergence of the molecular spectra. Two sources of noise limit the convergence, shot noise from the quantum measurements and sampling noise from the Monte Carlo procedure. Both can be made smaller by using more computational resources.

Here we have presented a method to improve model inference for NMR with relatively modest amount of quantum resources. We have constructed an application specific model from which a quantum machine can sample more efficiently than a classical computer. Model parameters are determined through a variational Bayesian approach with an informative prior, constructed by applying t-SNE to a dataset of small molecules. As a consequence of the noisy nature of the generative model, as well as the absence of significant gradients, both the initial bias as well as the derivative free nature of Bayesian inference are crucial to tackling the problem. This situation, however, is generic to any hybrid quantum-classical setting that is sufficiently complicated. A similar approach may thus be used to improve convergence of QAOA or VQE, e.g., heuristic optimization strategies for QAOA are available. Both the classical and quantum part of our approach can be extended further. On the quantum side, one can provide more efficient approaches for computing the spectra; trading computational time for extra quantum resources. On the classical side, variations on the inference algorithm may be provided, for example by combining or extending the variational method with Hamiltonian Monte Carlo techniques.

These techniques can be extended to other types of experiments. NMR is hardly the only problem where performing inference on spectroscopic data is useful. For example, one can combine resonant inelastic X-ray scattering (RIXS) data from strongly correlated electron systems, with Fermi-Hubbard simulators based on ultracold atoms. Currently, RIXS data is analyzed by performing numerical studies of small clusters on classical computers. A DMFT-based hybrid algorithm is also a possibility. With cold atoms in optical lattices one may be able to create larger systems and study their non-equilibrium dynamics corresponding to RIXS spectroscopy.

To perform clustering or find the best fit to a certain spectrum one has to define a measure of distance or equivalently of similarity between different spectra. A priori, there is no unique optimal choice for this and certain measures might be much better suited for the current problem then others. Let's therefore have a closer look at a few possible distance matrices: Euclidean—Equation 37; Hellinger—Equation 38; and Jensen-Shannon—Equation 39, where $A_i$ is short hand notation denoting $A_i=A(\omega|\theta_i)$.

$$D_2^2(i, j) = \int \frac{d\omega}{d\pi} (A_i - A_j)^2 \quad \text{Equation 37}$$

$$D_H^2(i, j) = \frac{1}{2} \int \frac{d\omega}{2\pi} \left(\sqrt{A_i} - \sqrt{A_j}\right)^2 \quad \text{Equation 38}$$

$$D_{JS}^2(i, j) = \frac{1}{2} \int \frac{d\omega}{2\pi} \left( A_i \log A_i + A_j \log A_j - (A_i + A_j) \log \frac{A_i + A_j}{2} \right) \quad \text{Equation 39}$$

Note that the spectrum is positive and can be normalized since it satisfies the f-sum rule, Equation 40, hence it makes sense to think of $A(\omega|\theta)$ (once normalized) as the conditional probability to generate an RF photon given the Hamiltonian $H(\theta)$.

$$S(0 \mid \theta) = \int \frac{d\omega}{2\pi} A(\omega \mid \theta) = \frac{Tr\left[(S_{tot}^z)^2\right]}{Tr[\mathbb{1}]} = \frac{N}{4} \quad \text{Equation 40}$$

In that respect one might suspect that statistical measures of distance might be better suited then a simple least square error. To check the performance of each of those measures we perform a t-SNE based on each of them and look at the t-SNE loss. FIG. 10A shows the distance matrix between all molecules in the dataset for the 3 different metrics under consideration. First of all, a lot of structure if observed in all three distance metrics. While the Hellinger distance and Jensen-Shannon distance are both qualitatively and quantitatively similar, the Euclidean distance only captures the large distance features well. By squaring the probability distribution, the Euclidean distance effectively only cares about the mode of the distribution, suppressing information about smaller peaks in the absorption spectrum. We observe better clustering for Hellinger and Jensen-Shannon distance, this is also quantified by the increased Kullback-Leibler loss of the Euclidean t-SNE. In fact, at the level of the t-SNE loss, the Hellinger distance performs the best.

In order to discuss whether actual spectra are atypical we need to define a notion of likelihood of a given spectra, that is we need a measure on the space of molecular parameters θ. The measure should be unbiased by any knowledge we believe to have about physical molecules. It should only satisfy some basic consistency conditions. One very simply and natural condition is that whatever measure we are sampling from, it ought not to depend on the way we parametrize our model. That is, if one makes a change of variables θ'=f(θ) it shouldn't change the likelihood of a given molecule since it represents exactly the same data. Based on this parametrization invariance, the distribution should therefore be proportional to the square root of the determinant of the Fisher information metric (FIM) of Equation 41, where $I_{ij}(\theta)$ is the FIM of Equation 42.

$$P(\theta) \propto \sqrt{\det I_{ij}(\theta)} \quad \text{Equation 41}$$

$$I_{ij}(\theta) = \int \frac{d\omega}{2\pi} A(\omega \mid \theta) \frac{\partial \log A(\omega \mid \theta)}{\partial \theta_i} \frac{\partial \log A(\omega \mid \theta)}{\partial \theta_j} \quad \text{Equation 42}$$

In Bayesian inference, P(θ) is known as Jeffrey's prior and is an example of a so called uninformative prior. The question of whether molecular parameters are typical thus becomes a question about the structure of the eigenvalues of the Fisher information metric. Some representative Fisher metrices for physical molecules are shown in FIG. 11. Note that the FIM is generally small and appears to be structured. The structure should become apparent when we look at the eigenvalues of the FIM. These are depicted in FIG. 12. Most molecules indeed seem to have a some eigenvectors—combinations of parameters—that are much more important than others, having eigenvalues that are exponentially larger than others. Such characteristic has been termed "sloppiness" in the past and it has been shown to arise naturally in multiparameter mathematical models that probe collective behavior; meaning they cannot probe the individual parameters but only have access to some coarse grained observable. NMR spectroscopy can be argued to be in this regime as there is no easy way to directly extract the model parameters from the spectrum.

The fact that there are irrelevant combinations of parameters immediately implies the molecules are unlikely because the determinant of the FIM must be small. In other words, these sloppy parameters represent approximate or possibly even exact symmetries of the molecules. Random models possess no symmetries and so molecules are atypical. Finally, note that even the large eigenvalues of the FIM are relatively small, sampling parameters $\theta_i$ from a normal distribution with zero mean and unit variance results in significantly larger eigenvalues, see red dots in FIG. 12. In fact, the FIM eigenvalues are of O(1) rather than $O(10^{-4})$. Given that we will only have a finite amount of data available to finally perform the inference, it would be extremely hard to converge to physical model parameters, starting from an uninformative prior. It's useful to actually take the sloppiness of molecules into account and start from a biased prior that already takes into account the aforementioned clustering.

Our goal is to extract spectrum (Equation 28) by measuring (Equation 27) and applying classical Fourier transform. Recall that, at infinite temperature we find Equation 43 where $m_j$ is the total z-magnetization in the eigenstate $|z_j\rangle$.

$$\begin{aligned} S(t \mid \theta) &= \sum_{j=1}^{2^N} \frac{m_j}{2^N} \langle z_j | e^{iH(\theta)t} S_{tot}^z e^{-iH(\theta)t} | z_j \rangle \\ &= \sum_{j=1}^{2^N} \frac{m_j}{2^N} \langle z_j(t) | S_{tot}^z | z_j(t) \rangle \end{aligned} \quad \text{Equation 43}$$

Consequently, we could extract the spectrum by initializing our system in a z-polarized product state, evolve under the Hamiltonian H(θ) for time t and measure the expectation value of $$S_{tot}^z.$$

However, in general, this naive procedure would have to be repeated an exponential amount of times to get an estimate of S(t|θ) and is therefore extremely inefficient.

Note however that $$S_{tot}^z$$

is hugely degenerate. There are $2^N$ states but only N+1 different magnetization sectors. We are thus sampling the same magnetization $m_1$ many times. In this case, a much smarter way to take sample averages is to create random superpositions of states within each fixed magnetization sector. Instead of starting with a product state $|z\rangle$, let us make a superposition: as in Equation 44, where $c_j$ are complex uniform random number of the sphere defined by $\Sigma_j |c_j|^2=1$.

$$|r_M\rangle = \sum_{j:m_j=M} c_j |z_j\rangle \quad \text{Equation 44}$$

Then, if we perform our quantum quench and measure the z-magnetization we find $$\langle r_M | S_{tot}^z(t) | r_M \rangle = \sum_{i:m_i=M} \sum_{j:m_j=M} c_i^* c_j \langle z_i | S_{tot}^z(t) | z_j \rangle \quad \text{Equation 45}$$

Taking expectation values of the random number $c_j$ we find Equation 46 where $\mathcal{H}_M$ denotes the Hilbert space of fixed z-magnetzation states.

$$\mathbb{E}_c[\langle r_M | S_{tot}^z(t) | r_M \rangle] = \frac{1}{dim \mathcal{H}_M} \sum_{i:m_i=M} \langle z_i | S_{tot}^z(t) | z_i \rangle \quad \text{Equation 46}$$

Consequently we can rewrite our response function as in Equation 47, where $p_j = \dim \mathcal{H}_j / 2^N$ is the fraction of computational basis states occupied by magnetization $m_1$ states.

$$S(t \mid \theta) = \sum_{j=1}^{N+1} p_j m_j \mathbb{E}_c[\langle r_j(t) | S_{tot}^z | r_j(t) \rangle] \quad \text{Equation 47}$$

Whether or not we have made any gain depends on how efficient we can get a sample average to approximate the true expectation $\mathbb{E}_c[\bullet]$. There are two parts to this, one practical—that is how long does it take to prepare such a state—and the other statistical. Let's start with the latter, in order to see how fast our sample average converges let's look at the variance of the magnetization $$\mathrm{Var}[\langle r_j(t)|S^z_{tot}|r_j(t)\rangle] = \frac{Tr_{\mathcal{H}_j}\left[S^z_{tot}(t)^2\right]}{(dim\mathcal{H}_j)^2} \leq \frac{N^2}{4dim\mathcal{H}_j} \quad \text{Equation 48}$$

The inequality simply follows from the fact that the magnetization can never be larger than N/2. Fluctuations around the mean are thus suppressed by a factor $1/\dim\mathcal{H}_j$. This clearly solves the sampling problem in our naïve expression Equation 43. The exponential sum is due to magnetization sectors which are exponentially large but all of those will have exponentially small fluctuations around the mean if we simply sample a single random vector in that subspace. Finally note that another factor of 2 can be gained because the entire response is invariant under taking $$S^z_{tot} \to -S^z_{tot};$$

consequently sampling either the positive or the negative magnetization subsector is sufficient.

This brings us to the second question, how do we generate those states? First of all note that we do not really need to generate Haar random states, we only need pseudorandom states that appear sufficiently random to guarantee that the same average value of the magnetization and similar variance such that convergence is fast. We expect this to be the case if we simply initialize the system in a product state with fixed $m_j$ and evolve the system under some unitary which conserves $$S^z_{tot}$$

but other than that has no conserved quantities. A simple Hamiltonian that would serve the purpose is anything of the form $$H_{mix} = \sum_{ij}\left(A_{ij}S^z_iS^z_j + B_{ij}\left(S^+_iS^-_j + S^-_iS^+_j\right)\right) + \sum_i C_iS^z_i \quad \text{Equation 49}$$

To avoid the energy to be conserved one has to change $H_{mix}$ in time between at least two non-commuting versions. In other words, we can simply make a random circuit out of Ising XY, ZZ-gates and phase shift gates. A good pseudorandom state is obtained once we manage to entangle all the qubits; since we only wish to measure the magnetization which is completely local. Even if we were to do it with a local Hamiltonian, constraint by Lieb-Robinson bounds, we expect maximal entanglement to be generated at a time $t \sim N^{1/d}$ in d-dimensions. If we consider coupling between any pair of qubits this is even reduced to t~log N.

This is illustrated in FIG. 13A shows the distance between true uniform sampling and the ensemble averaged state obtained by unitary scrambling of the states in a random z-conserving circuit. Clearly, there is very little dependence of the mixing time on the system size. In fact for the small systems under consideration we see almost perfect mixing for circuits of depth 6. In FIG. 13B, the variance of the z distribution is shown for different circuits and different system sizes. We clearly see exponential decay of the variance in each sample with system size, moreover the circuit-to-circuit fluctuations also decrease. For sufficiently wide circuits it thus suffices to take a single sample out of a single circuit to estimate the ensemble average.

In various embodiments, uniform sampling is employed. However, it will be appreciated that the approaches described herein may be used with alternative methods of sampling including importance sampling.

In various embodiments, it is an objective to measure $$S(t) = \frac{Tr[S^z_{tot}(t)S^z_{tot}]}{Tr[\mathbb{1}]}, \quad \text{Equation 50}$$

In the diagonal basis in $$S^z_{tot},$$

this can written as $$S(t) = \sum_{i,j} m_im_jP_t(i\mid j)P_0(j) = \sum_{i,j} m_im_jP_t(i, j), \quad \text{Equation 51}$$

with $$P_t(i\mid j) = |\langle i|U_t|j\rangle|^2 \text{ and } P_0(j) = \frac{1}{2^N}. \quad \text{Equation 52}$$

The following discussion compares various sampling schemes: (i) uniform sampling out of $P_0$; (ii) sampling from a Gibbs distribution of the total magnetization; and (iii) importance sampling. We will compare the convergence of the different estimands of S(t).

The most direct procedure would be to draw uniform random states i—out of $P_0$—and propagate them under the quantum Hamiltonian, after which j is measured. In that case, the random variable being estimated is $m_im_j$ and hence its variance is given by $$\mathrm{var}[m_im_j] = \sum_{i,j} m_i^2m_j^2P_t(i\mid j)P_0(j) - S(t)^2. \quad \text{Equation 53}$$

This cannot be compute generally, as $P_t$ is hard to compute. For t=0:

$$S(t) = \frac{Tr\left[(S^z_{tot})^2\right]}{Tr[\mathbb{1}]} = \frac{N}{4}, \quad \text{Equation 54}$$

and $$\mathrm{var}[m_im_j] = \frac{Tr\left[(S^z_{tot})^4\right]}{Tr[\mathbb{1}]} - S(t)^2 = \frac{1}{16}\left(3N^2 - 2N\right) - S(t)^2 = \frac{N(N-1)}{8}. \quad \text{Equation 55}$$

Consequently, to have the sample variance be constant $\varepsilon^2$, such that there is a fixed precision, the number of samples should be of $O(N^2/\varepsilon^2)$. How much will the variance increase once the system is evolved in time? Note that the random variable being estimated is bounded, that is, the magnetization cannot be larger than N/2. Hence, the variance cannot exceed $O(N^4)$ in general. There are, however, much more constraints on the present problem such that a stronger bound may be placed on the variance from expression (S7). Reorganizing terms gives:

$$\mathrm{var}[m_i m_j] = \sum_{i,j}\left(m_j^2\sqrt{P_t(i\mid j)P_0(j)}\right)\left(m_i^2\sqrt{P_t(i\mid j)P_0(j)}\right) - S(t)^2 \leq \sqrt{\sum_{i,j} m_j^4 P_t(i\mid j)P_0(j)\sum_{i,j} m_i^4 P_t(i\mid j)P_0(j)}, \quad \text{Equation 56}$$

where Cauchy-Schwarz has been used and the S(t) term is dropped. Further note that because of the reversibility of the quantum evolution $P_t(i|j)=P_t(j|i)$, such that $\Sigma_i P_t(i|j)=\Sigma_j P_t(i|j)=1$. In addition, $P_0$ is the uniform distribution, giving:

$$\mathrm{var}[m_i m_j] \leq \frac{1}{2^N}\sum_i m_j^4 = \frac{Tr\left[(S_{tot}^z)^4\right]}{Tr[\mathbb{1}]} \leq 3(N/4)^2, \quad \text{Equation 57}$$

Consequently, the number of samples never needs to exceed order $O(N^2/\varepsilon^2)$. Finally, note that, for ergodic systems, one expects the transition probability to become close to uniform at late time, where $P_t(i|j)\approx 1/2^N$. The latter reflects the fact that those systems thermalize and effectively forget their initial conditions. In that case, the variance can also be explicitly computed:

$$\mathrm{var}[m_i m_j] = \left(\frac{Tr\left[(S_{tot}^z)^2\right]}{Tr[\mathbb{1}]}\right)^2 = (N/4)^2 \quad \text{Equation 58}$$

Under uniform sampling, there is thus $N^2$ scaling of the variance both at early and late times, with a guarantee that it will never be larger than that.

Before discussing how to improve the $N^2$, consider what happens for t=0 when sampling from a thermal state. Those states are particularly relevant for experiments as they might, in some particular setups, be much faster to prepare.

$$\rho = \frac{1}{Z}e^{\beta S_{tot}^z}. \quad \text{Equation 59}$$

For sufficiently small β:

$$S(t) \approx \beta^{-1} Tr[S_{tot}^z(t)\rho] \quad \text{Equation 60}$$

At t=0 and for $\beta\to\infty$, the variance of the estimator becomes:

$$\mathrm{var}[m_i] = Tr[S_{tot}^z\rho] = \frac{N}{4}. \quad \text{Equation 61}$$

Hence, the number of samples to get a precision of ε scales like $N/\beta^2\varepsilon^2$. If one demands all subleading terms in the Taylor expansion of ρ to be subleading, one should set $\beta\sim 1/N$. Since the objective is to get S(t) at precision anyway, one needs to set $\beta=O(\sqrt{\varepsilon}/N)$. Indeed, expanding ρ in powers β, of one gets:

$$S(0) = \beta^{-1} Tr[S_{tot}^z\rho] \propto Tr\left[(S_{tot}^z)^2\right] + \frac{\beta^2}{6}Tr\left[(S_{tot}^z)^4\right] + O(\beta^4 N^3). \quad \text{Equation 62}$$

The second term is of $O(\beta^2 N^2)$, implying a requirement that $\beta^2<\varepsilon/N^2$ to achieve an accuracy of ε. Combined with the scaling of the variance a scaling of $O(N^3/\varepsilon^3)$ is obtained to reach the desired accuracy and precision.

Sampling from the thermal state is thus a factor N/ε less efficient as uniform sampling. The below considers importance sampling, and whether there is a distribution such that less than $O(N^2)$ samples are needed. One can recast the problem of estimating S(t) as:

$$S(t) = \sum_{i,j}\frac{P_0(j)m_i m_j}{Q_0(j)}P_t(i\mid j)Q_0(j), \quad \text{Equation 63}$$

where $Q_0$ is the distribution from which initial states will be sampled. This gives the same correlation function, but the stochastic variable r being estimated is now different:

$$r = \frac{P_0(j)m_i m_j}{Q_0(j)}. \quad \text{Equation 64}$$

The variance now becomes $$\mathrm{var}[r] = \sum_{i,j}\left[\left(\frac{P_0(j)m_i m_j}{Q_0(j)}\right)^2 P_t(i\mid j)Q_0(j)\right] - S(t)^2 \quad \text{Equation 65}$$

An optimal sampling algorithm (at least in the central limit regime) would exist with minimization of the variance of the estimator with respect to the sampling distribution. Hence, deriving the variance with respect to the sampling distribution $Q_0$, and putting in a Lagrange multiplier to keep the distribution normalized gives:

$$\sum_i\left(\frac{P_0(j)m_i m_j}{Q_0(j)}\right)^2 P_t(i\mid j) = \mu, \quad \text{Equation 66}$$

Hence $$Q_0(j) = \frac{1}{\mu(t)}|m_j|P_0(j)\sqrt{\sum_i m_i^2 P_t(i\mid j)} \text{ with } \mu(t) = \sum_j |m_j|P_0(j)\sqrt{\sum_i m_i^2 P_t(i\mid j)}. \quad \text{Equation 67}$$

The variance then becomes $$\mathrm{var}[r] = \mu(t)^2 - S(t)^2 \quad \text{Equation 68}$$

In general the optimal distribution depends on time through the transition probability $P_t$. Since there is not access to that distribution, optimal sampling cannot be performed. However, as discussed before, there are two limits worth investigating t=0 and $t\to\infty$. When t=0, $P_t=\delta_{ij}$, consequently:

$$Q_0 = \frac{N}{4}\frac{m_j^2}{2^N}, \text{ and } \mathrm{var}[r] = 0 \quad \text{Equation 69}$$

This makes sense, since the random variable being estimated r=N is a constant. Hence, there is nothing to estimate. Note that at late times, when $P_f \approx 1/2^N$, this sampling distribution results in a variance of $(N/4)^2$, which is identical to the late time variance of the uniform sampling problem. In fact the variance at all times is:

$$\mathrm{var}[r] = \left(\frac{N}{4}\right)^2 - S(t)^2. \quad \text{Equation 70}$$

Improving on the uniform sampling by a factor 3. Finally, note that at late times the optimal sampling distribution should tend to:

$$Q_0 \propto |m_j|, \quad \text{Equation 71}$$

which would result in a variance $\mathrm{var}[r] \approx N^2/8\pi$ in the large-N limit. Consequently, it only reduces the variance of the estimand at late times by a factor $\pi/2$ over the other sampling schemes, while significantly increasing the short time fluctuations. In conclusion, it thus seems most efficient to sample from the short time optimal distribution, as it supresses the variance to zero at early times while always outperforming uniform sampling.

Referring to FIG. 14, a method for determining properties of a molecule is illustrated. At 1401, a state is prepared on a quantum computer, the state corresponding to a physical property. At 1402, the state is evolved on the quantum computer, said evolution corresponding to a Hamiltonian having a plurality of parameters, the plurality of parameters corresponding to a hypothetical molecule. At 1403, the state is sampled after said evolution, thereby determining hypothetical observations of the hypothetical molecule.

Referring now to FIG. 15, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 15, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

preparing a state on a quantum computer, the state corresponding to a physical property;

evolving the state on the quantum computer, said evolution corresponding to a Hamiltonian having a plurality of parameters, the plurality of parameters corresponding to a hypothetical molecule;

sampling the state after said evolution, thereby determining hypothetical observations of the hypothetical molecule, wherein the hypothetical observations comprise Nuclear Magnetic Resonance (NMR) spectra.

2. The method of claim 1, further comprising:

comparing the hypothetical observations to actual observations;

based on said comparing, varying the plurality of parameters to minimize a difference between the hypothetical observations and the actual observations.

3. The method of claim 2, wherein said varying the plurality of parameters comprises variational Bayesian inference or gradient descent.

4. The method of claim 1, wherein the quantum computer comprises a plurality of system qubits, and wherein said sampling further comprises:

measuring the plurality of system qubits.

5. The method of claim 4, wherein said sampling further comprises:

applying a fast Fourier transform to determine a spectrum corresponding to the hypothetical molecule.

6. The method of claim 1, wherein the quantum computer comprises a plurality of system qubits and a plurality of control qubits, each of the plurality of control qubits corresponding to one of the plurality of system qubits, the method further comprising:

initializing the plurality of control qubits according to an equal superposition of all controls.

7. The method of claim 6, wherein said sampling further comprises:

measuring the plurality of control qubits.

8. The method of claim 6, wherein said sampling further comprises:

applying a quantum fast Fourier transform to determine a spectrum corresponding to the hypothetical molecule.

9. The method of claim 6, wherein said preparing further comprises:

preparing the plurality of system qubits with an initial state;

coupling each of the plurality of system qubits with one of the plurality of control qubits;

coupling an ancilla qubit to an operator, the operator corresponding to the physical property;

coupling each system qubit and its corresponding control qubit to the ancilla qubit;

measuring the ancilla qubit.

10. The method of claim 9, wherein coupling each system qubit and its corresponding control qubit to the ancilla qubit comprises applying a Hadamard gate to each system qubit.

11. The method of claim 1, wherein sampling comprises uniform sampling or importance sampling.

12. A system comprising:

a quantum computer; and a computing node, wherein the computing node is configured to prepare a state on the quantum computer, the state corresponding to a physical property, the quantum computer is configured to evolve the state, said evolution corresponding to a Hamiltonian having a plurality of parameters, the plurality of parameters corresponding to a hypothetical molecule, and the computing node is configured to sample the state after said evolution, thereby determining hypothetical observations of the hypothetical molecule, wherein the hypothetical observations comprise NMR spectra.

13. The system of claim 12, wherein the computing node is configured to:

compare the hypothetical observations to actual observations;

based on said comparing, varying the plurality of parameters to minimize a difference between the hypothetical observations and the actual observations.

14. The system of claim 12, wherein the quantum computer comprises a plurality of system qubits, and wherein said sampling further comprises:

measuring the plurality of system qubits.

15. The system of claim 12, wherein the quantum computer comprises a plurality of system qubits and a plurality of control qubits, each of the plurality of control qubits corresponding to one of the plurality of system qubits, wherein the computing node is configured to:

initialize the plurality of control qubits according to an equal superposition of all controls.

16. The system of claim 15, wherein said sampling further comprises:

applying a quantum fast Fourier transform to determine a spectrum corresponding to the hypothetical molecule.

17. The system of claim 15, wherein:

the computing node is configured to prepare the plurality of system qubits with an initial state;

the quantum computer is configured to couple each of the plurality of system qubits with one of the plurality of control qubits;

the quantum computer is configured to couple an ancilla qubit to an operator, the operator corresponding to the physical property;

the quantum computer is configured to couple each system qubit and its corresponding control qubit to the ancilla qubit; and the computing node is configured to measure the ancilla qubit.

18. The system of claim 17, wherein coupling each system qubit and its corresponding control qubit to the ancilla qubit comprises applying a Hadamard gate to each system qubit.

19. A computer program product for sampling many-body spectral functions, the computer program product comprising a computer readable storage medium having program instructions embodied therewith, the program instructions executable to perform a method comprising:

preparing a state on a quantum computer, the state corresponding to a physical property;

evolving the state on the quantum computer, said evolution corresponding to a Hamiltonian having a plurality of parameters, the plurality of parameters corresponding to a hypothetical molecule;

sampling the state after said evolution, thereby determining hypothetical observations of the hypothetical molecule, wherein the hypothetical observations comprise NMR spectra.

* * * * *